United States Patent
Uno

(10) Patent No.: US 9,945,674 B2
(45) Date of Patent: Apr. 17, 2018

(54) MOVEMENT GUIDANCE DEVICE AND MOVEMENT GUIDANCE METHOD

(71) Applicant: TOYOTA JIDOSHA KABUSHIKI KAISHA, Toyota-shi, Aichi-ken (JP)

(72) Inventor: Satoshi Uno, Tokyo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 67 days.

(21) Appl. No.: 15/021,017

(22) PCT Filed: Sep. 12, 2014

(86) PCT No.: PCT/IB2014/001971
§ 371 (c)(1),
(2) Date: Mar. 10, 2016

(87) PCT Pub. No.: WO2015/036853
PCT Pub. Date: Mar. 19, 2015

(65) Prior Publication Data
US 2016/0223337 A1    Aug. 4, 2016

(30) Foreign Application Priority Data

Sep. 13, 2013   (JP) ................................ 2013-190771

(51) Int. Cl.
G01C 21/20    (2006.01)
G01C 21/34    (2006.01)
G01C 21/36    (2006.01)

(52) U.S. Cl.
CPC ......... *G01C 21/20* (2013.01); *G01C 21/3407* (2013.01); *G01C 21/3626* (2013.01)

(58) Field of Classification Search
CPC . G01C 21/20; G01C 21/3407; G01C 21/3626
See application file for complete search history.

(56) References Cited

U.S. PATENT DOCUMENTS 7,388,541 B1 *   6/2008   Yang ................... G01C 21/206
                                                    342/464
2005/0093720 A1   5/2005   Yamane et al.
(Continued)

FOREIGN PATENT DOCUMENTS

JP           7-83685 A      3/1995
JP       2005-122461 A      5/2005
(Continued)

*Primary Examiner* — Rodney A Butler
(74) *Attorney, Agent, or Firm* — Sughrue Mion, PLLC

(57) ABSTRACT

The movement guidance device includes a first unit which calculates at least one of an error range of a first arrival time and an error range of a first movement time in a first route to the destination, a second unit which calculates at least one of an error range of a second arrival time and an error range of a second movement time in a second route, which is a route to the destination and is different from the first route, at a point where the second route is branched from the first route, and an output unit which outputs at least one of the error range of the second arrival time and the error range of the second movement time calculated by the second unit based on whether the error range calculated by the second unit is smaller than the error range calculated by the first unit.

16 Claims, 28 Drawing Sheets

(56) References Cited

U.S. PATENT DOCUMENTS

| | | |
|---|---|---|
| 2006/0111836 A1 | 5/2006 | Fast et al. |
| 2009/0048775 A1 | 2/2009 | Okude et al. |
| 2014/0288821 A1* | 9/2014 | Modica ................. G06Q 50/30 |
| | | 701/465 |

FOREIGN PATENT DOCUMENTS

| JP | 2006-38742 A | 2/2006 |
|---|---|---|
| JP | 2006-170982 A | 6/2006 |
| JP | 2006-292574 A | 10/2006 |
| JP | 2008-96445 A | 4/2008 |
| JP | 2009-42051 A | 2/2009 |

* cited by examiner

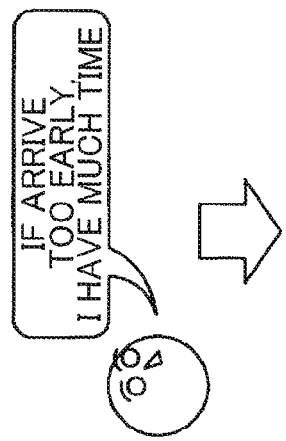
FIG. 2A
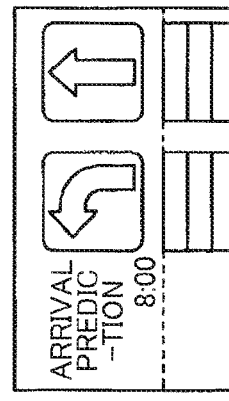
FIG. 2C
FIG. 2E
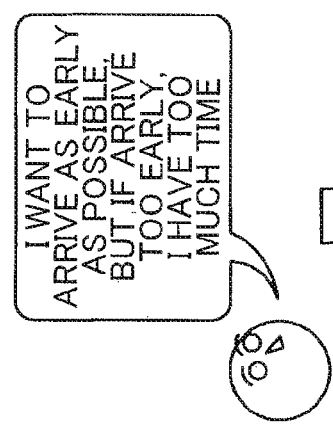
FIG. 2B
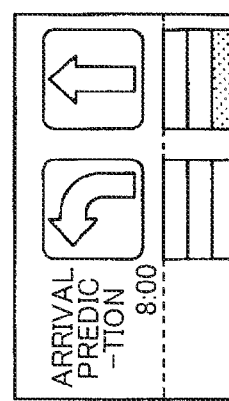
FIG. 2D
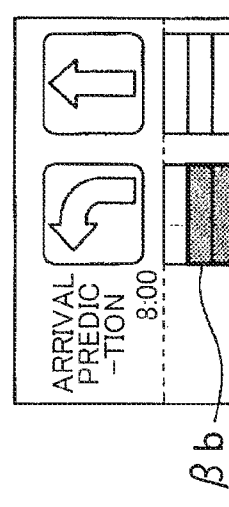
FIG. 2F

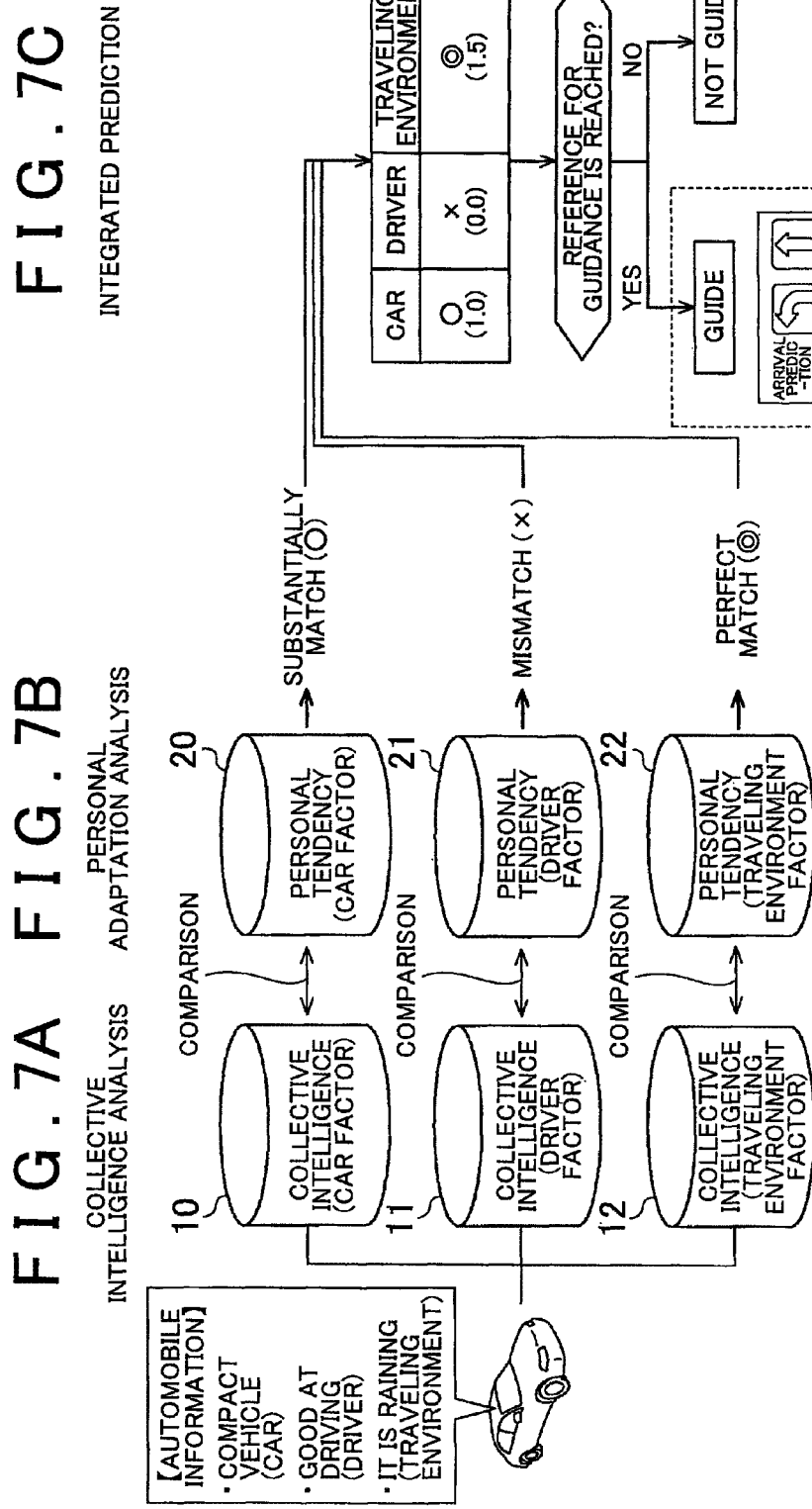

FIG. 8A COLLECTIVE INTELLIGENCE ANALYSIS
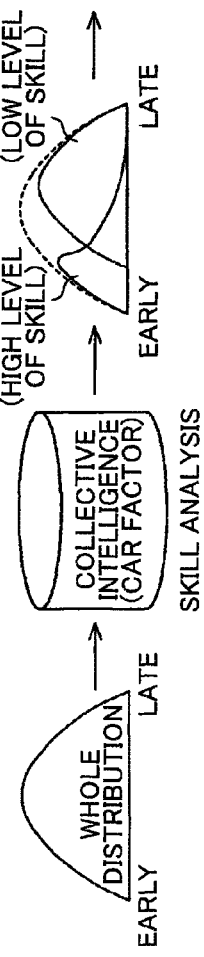
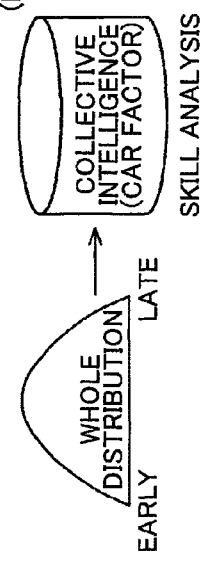
FIG. 8B PERSONAL ADAPTATION ANALYSIS
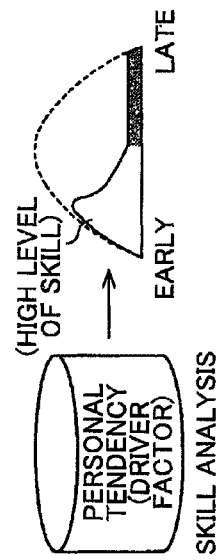

MOVEMENT GUIDANCE DEVICE AND MOVEMENT GUIDANCE METHOD

CROSS REFERENCE TO RELATED APPLICATIONS

This application is a National Stage of International Application No. PCT/IB2014/001971 filed Sep. 12, 2014, claiming priority based on Japanese Patent Application No. 2013-190771 filed Sep. 13, 2013, the contents of all of which are incorporated herein by reference in their entirety.

BACKGROUND OF THE INVENTION

1. Field of the Invention

The present invention relates to a movement guidance device and a movement guidance method which are usefully applied to guidance relating to movement of a mobile object to a destination.

2. Description of Related Art

In recent years, an information terminal, such as a navigation system for a vehicle, is provided with a function of guiding a route from a present place to a destination. This type of information terminal guides a driver with the route to the destination to a driver and with a predicted arrival time, which is the time at which the vehicle arrives at the destination or the time necessary until the arrival. The predicted arrival time calculated in an undifferentiated manner based on a traveling distance from a departure place to the destination changes every time depending on a road situation or the like, and thus there is often a difference between an actual arrival time and the predicted arrival time. Accordingly, for example, a device described in Japanese Patent Application Publication No. 2008-96445 (JP 2008-96445 A) is configured to calculate an error in predicted arrival time based on the degree of variation of traffic information for use in calculating the predicted arrival time. The device described in JP 2008-96445 A is configured to display the calculated error along with the predicted arrival time.

On the other hand, for example, if the predicted arrival time and a range of error of several minutes to tens of minutes before and after the predicted arrival time are guided, the driver has to recognize the predicted arrival time at a wide time width including an error. Then, for example, while the driver determines that the vehicle arrives at the earliest time out of the predicted arrival time including an error, when an actual arrival time is the latest time out of the predicted arrival time including an error, there is a significant difference between the predicted arrival time including an error expected by the driver and the actual arrival time. For this reason, even though an error in predicted arrival time is displayed, the driver is likely to feel unease.

SUMMARY OF THE INVENTION

The invention provides a movement guidance device and a movement guidance method capable of, in route guidance, increasing the suitability of arrival prediction including an error or output of the time until arrival.

A movement guidance device according to a first aspect of the invention guides at least one of a predicted arrival time at which a mobile object is predicted to arrive at a destination and a movement time necessary until the mobile object arrives at the destination. The movement guidance device includes a first calculation unit which calculates at least one of a prediction error range of a first predicted arrival time and a prediction error range of a first predicted movement time in a first recommended route to the destination, a second calculation unit which calculates at least one of a prediction error range of a second predicted arrival time and a prediction error range of a second predicted movement time in a second recommended route, which is a route to the destination and is different from the first recommended route, at a point where the second recommended route is branched from the first recommended route, and a predicted value output unit which outputs at least one of the prediction error range of the second predicted arrival time and the prediction error range of the second predicted movement time calculated by the second calculation unit based on whether or not the prediction error range calculated by the second calculation unit is smaller than the prediction error range calculated by the first calculation unit.

A movement guidance method according to a second aspect of the invention guides at least one of a predicted arrival time at which a mobile object is predicted to arrive at a destination and a movement time necessary until the mobile object arrives at the destination. The movement guidance method includes calculating at least one of a prediction error range of a first predicted arrival time and a prediction error range of a first predicted movement time in a first recommended route to the destination, calculating at least one of a prediction error range of a second predicted arrival time and a prediction error range of a second predicted movement time in a second recommended route, which is a route to the destination and includes one to a plurality of routes different from the first recommended route, at a point where the second recommended route is branched from the first recommended route; and outputting at least one of the prediction error range of the second predicted arrival time and the prediction error range of the second predicted movement time based on whether the calculated prediction error range relating to the second recommended route is smaller than the calculated prediction error range relating to the first recommended route.

According to the above-described aspect, at least one of the prediction error range of the predicted arrival time and the prediction error range of the predicted movement time for each of the first and second recommended routes is calculated. That is, variation in predicted arrival time or predicted movement time when the first recommended route is used and variation in predicted arrival time or predicted movement time when the second recommended route is used are calculated. Then, the output of information relating to the second recommended route is performed through comparison for determination about whether or not variation relating to the second recommended route is smaller than variation relating to the first recommended route. Accordingly, the calculated information relating to the first and second recommended routes is not output in a random manner and guided to the user. With this, in the route guidance, the suitability of arrival prediction with an error or the output of the time until arrival is increased.

In the above-described aspect, the predicted value output unit may perform, as the output of the prediction error range, one of controls: a: control for performing "no" output when the prediction error range calculated by the first calculation unit and the prediction error range calculated by the second calculation unit are equal to or greater than a predetermined range, b: control for performing the output of at least only one of the prediction error ranges of the first predicted arrival time and the first predicted movement time when the prediction error range calculated by the first calculation unit is smaller than the prediction error range calculated by the second calculation unit, c: control for performing the output of at least one of the prediction error range of the second predicted arrival time and the prediction error range of the second predicted movement time calculated by the second calculation unit when the prediction error range calculated by the second calculation unit is smaller than the prediction error range calculated by the first calculation unit, and d: control for simultaneously performing the output of at least one of the prediction error ranges of the first predicted arrival time and the first predicted movement time and at least one of the prediction error ranges of the second predicted arrival time and the second predicted movement time.

In the above-described aspect, when the prediction error range calculated by the first calculation unit and the prediction error range calculated by the second calculation unit are equal to or greater than a predetermined range, control for performing "no" output is performed. That is, when the prediction error ranges relating to the first and second recommended routes are equal to or greater than a predetermined range and precision of the predicted arrival time or the predicted movement time is low, information relating to any recommended route is not output. Accordingly, output and guidance of information with low precision are not performed, thereby suppressing the provision of unreliable information to the user. With this, a potential concern for the user caused by the guidance of unreliable information is suppressed.

In the above-described aspect, when the prediction error range calculated by the first calculation unit is smaller than the prediction error range calculated by the second calculation unit, control for performing the output of at least only one of the prediction error ranges of the first predicted arrival time and the first predicted movement time is executed. That is, when precision of information relating to the first recommended route is relatively high, information relating to the second recommended route as further guidance different from the first recommended route is not output, and only information relating to the first recommended route is output. Accordingly, in the middle of the guidance of information relating to the first recommended route, the guidance of information with precision lower than information relating to the first recommended route is suppressed.

In the above-described aspect, when the prediction error range calculated by the second calculation unit is smaller than the prediction error range calculated by the first calculation unit, control for performing the output of at least only one of the prediction error ranges of the second predicted arrival time and the second predicted movement time is executed. That is, when precision of information relating to the second recommended route is relatively high, information relating to the second recommended route as further guidance different from the first recommended route is output, and only information relating to the second recommended route is output. Accordingly, the necessity of the output of information relating to the first recommended route with relatively low precision is reduced due to the presence of information relating to the second recommended route, and the output is not performed. With this, it becomes possible for the user to easily confirm information with relatively high precision.

In the above-described aspect, when the prediction error range calculated by the second calculation unit is smaller than the prediction error range calculated by the first calculation unit, information relating to the first and second recommended routes is output. For this reason, for example, when the first recommended route which is searched for normal guidance is constantly guided to the user, and high-precision information relating to the second recommended route with the prediction error range smaller than the first recommended route is obtained, information relating to the second recommended route is also guided to the user. Accordingly, it becomes possible for the user to recognize two kinds of information relating to the first and second recommended routes.

In the above-described aspect, the predicted value output unit may limit the output of the prediction error range calculated by the second calculation unit when it is determined that a predetermined condition is not established for the second recommended route through comparison with the first recommended route.

Even when the prediction error range of the second recommended route is relatively small, if other elements are included, it is assumed that there is a disadvantage compared to the first recommended route. From this point, according to the above-described configuration, when it is determined that the predetermined condition is not established for the second recommended route through comparison with the first recommended route, the output of the prediction error range calculated by the second calculation unit is limited. Accordingly, from a viewpoint other than the prediction error range, output is performed taking into consideration advantages and disadvantages for information relating to the first and second recommended routes.

In the above-described aspect, the predetermined condition may be a condition relating to at least one of the magnitude of movement cost necessary for the movement of the mobile object, the latest time in the prediction error range of the predicted arrival time, and the longest time in the prediction error range of the predicted movement time, and the predicted value output unit may limit the output of the predicted value calculated by the second calculation unit when at least one of conditions that the prediction error range calculated by the second calculation unit has movement cost "large", the latest time "late" in the prediction error range of the predicted arrival time, and the longest time "long" of the prediction error range of the predicted movement time compared to the prediction error range calculated by the first calculation unit is satisfied.

In particular, advantages or disadvantages for users according to the presence/absence of the display of information are determined by the magnitude of movement cost, the lateness or earliness of the predicted arrival time, and the length of the predicted movement time. That is, for example, even though precision of information relating to the second recommended route is higher than precision of information relating to the first recommended route, if movement cost relatively increases, the predicted arrival time is later, or the predicted movement time increases, this is often disadvantageous to users.

From this point, in the above-described aspect, when there is a disadvantage for the user from the viewpoint of the magnitude of movement cost, the lateness and earliness of the predicted arrival time, and the length of the predicted movement time, for example, even though precision is relatively high, the output of information relating to the second recommended route is limited. Accordingly, only when precision is high and there is a high advantage from the viewpoint of at least one of the magnitude of movement cost, the lateness and earliness of the predicted arrival time, and the length of the predicted movement time, information relating to the second recommended route is guided to the user.

In the above-described aspect, the predicted value output unit may limit the output of the prediction error range calculated by the second calculation unit when it is determined that the prediction error range of the second predicted arrival time calculated by the second calculation unit does not satisfy a predetermined condition for at least one of a target arrival time of the user of the mobile object and an occurrence time zone of an event at the destination.

In the above-described aspect, when the prediction error range of the second predicted arrival time does not satisfy the predetermined condition for the target arrival time of the mobile object or the user of the mobile object, in other words, when the predetermined condition is not satisfied by the earliest time and the latest time of the second predicted arrival time, the target arrival time is missed or the target arrival time is too early, and thus the output of the prediction error range calculated by the second calculation unit is limited.

In the above-described aspect, when the prediction error range of the second predicted arrival time does not satisfy the predetermined condition for an event time zone, such as an appointment time with a third party or a holding time zone of a performance or the like at the destination, in other words, when the predetermined condition is not satisfied by the earliest time and the latest time of the second predicted arrival time, the occurrence time zone of the event is missed or the occurrence time zone of the event is too early, and thus the output of the prediction error range calculated by the second calculation unit is limited.

Accordingly, the output of information relating to the second recommended route is limited according to the occurrence time zone of the event and the arrival timing when the second recommended route is used, and only when there is a high advantage in displaying with the respective elements, the output of information relating to the second recommended route is performed.

In the above-described aspect, the predetermined condition for the target arrival time or the occurrence time zone of the event may be at least one of a condition that the difference between the prediction error range of the second predicted arrival time and the target arrival time or the occurrence time zone of the event is equal to or greater than a predetermined time and a condition that a delay occurs with a mobile object after arrival at the destination or in the schedule of the user of the mobile object.

In the above-described aspect, as the predetermined condition for the target arrival time or the occurrence time zone of the event, a condition that the difference between the prediction error range of the second predicted arrival time and the target arrival time or the occurrence time zone of the event is equal to or greater than a predetermined time is defined. Accordingly, when it is earlier or later than the target arrival time or the occurrence time zone of the event by a predetermined time or more, there is a low advantage in using the second recommended route, and thus the guidance of the second recommended route is limited.

In the above-described aspect, as the predetermined condition for the target arrival time or the occurrence time zone of the event, a condition that a delay occurs with the mobile object after arrival at the destination or in the schedule of the user of the mobile object is defined. That is, even though it is in time for the target arrival time to the destination, when an arrival time or a movement time is predicted such an extent that a delay occurs in the subsequent schedule of the user, there is a low advantage in using the second recommended route, and thus the guidance of the second recommended route is limited.

In the above-described aspect, a predetermined point for use in the calculation of the prediction error range may be in terms of intersections or branch roads, and the predicted value output unit may output the prediction error range each time the mobile object reaches a position near a predetermined point by a predetermined distance.

At an intersection or a branch road, the second recommended route which is branched from the intersection or the branch road is easily searched. In particular, the prediction error range of the second recommended route is calculated in terms of intersections or branch roads, whereby the up-to-date prediction error range relating to the second recommended route is calculated according to the movement position of the mobile object. Then, the up-to-date prediction error range of the second recommended route is compared with the prediction error range of the first recommended route, whereby determination is dynamically performed about whether or not the output of information relating to the second recommended route is necessary.

In the above-described aspect, the second calculation unit may calculate the prediction error range based on collective intelligence data, in which a movement history of each of a plurality of mobile objects are registered by feature quantity, and the predicted value output unit may evaluate a degree of coincidence of the collective intelligence data and the movement pattern of a mobile object to be an output target of the prediction error range by factor relating to the mobile object, factor relating to the user of the mobile object, and factor relating to a movement environment of the mobile object and may perform determination about whether or not the output of information relating to the second recommended route is necessary based on whether or not the evaluated degree of coincidence is equal to or greater than a predetermined degree of coincidence.

According to the above-described aspect, the movement time of the second recommended route, the arrival time to the destination, and the prediction error ranges of the movement time and the arrival time are calculated based on collective intelligence data. With this, the movement time, the arrival time, and the prediction error ranges are calculated based on the traveling histories of a plurality of vehicles, which actually travel on a road. Accordingly, it is expected that information relating to the second recommended route has an actual traveling environment further reflected therein and becomes higher-precision information.

In the above-described aspect, the degree of coincidence of collective intelligence data and the movement pattern of a mobile object to be an output target of the prediction error range is evaluated by factor relating to the mobile object, factor relating to the user of the mobile object, and factor relating to the movement environment of the mobile object. Then, determination is performed with the evaluated degree of coincidence about whether or not the output of the prediction error range relating to the second recommended route is necessary. For this reason, for example, when the degree of coincidence is low, information representing the movement time, the arrival time, and the prediction error ranges calculated based on collective data is output as high-precision information conforming to the characteristic of the user. Accordingly, the output of information relating to the second recommended route is performed based on whether or not the characteristic of collective data is similar to the characteristic of the user, and information conforming to the characteristic of the user is provided.

In the above-described aspect, the first calculation unit may calculate the prediction error range based on traffic information or map data distributed from a road traffic information center, and the second calculation unit may calculate the prediction error range based on a movement history of each of a plurality of mobile objects.

In the above-described aspect, for example, the prediction error range of the first recommended route is calculated based on link cost or the like representing traffic information or map data generated in terms of links. In contrast, the prediction error range of the second recommended route is calculated based on the movement histories of a plurality of mobile objects. That is, the movement history of a plurality of mobile objects can be acquired from actual vehicles as so-called collective intelligence, and represent the time necessary for actual movement of a plurality of vehicles or the arrival time. A dynamic traveling environment, such as road work or congestion characteristics, is reflected in the movement histories, and thus precision of the arrival time, the movement time, and the prediction error ranges calculated based on the movement histories becomes high based on actual situations.

From this point, in the above-described aspect, information relating to the second recommended route is calculated based on the movement histories of a plurality of mobile objects, whereby precision of the second recommended route output as information to be recommended different from the first recommended route is further increased.

In the above-described aspect, the calculation of the prediction error range may be performed based on the movement history of a mobile object to be an output target of the prediction error range or traffic information distributed from a road traffic information center, and the second calculation unit may acquire the movement history or the traffic information at a relatively high frequency compared to the first calculation unit and may dynamically calculate a prediction error range based on the acquired movement history or traffic information.

In the above-described aspect, the second calculation unit acquires the movement history or traffic information at a relatively high frequency compared to the first calculation unit, and dynamically calculate the prediction error range based on the acquired movement history or traffic information. For this reason, for example, if a traffic flow changes depending on congestion or a time zone, the movement time, the arrival time, and the prediction error ranges of the second recommended route calculated by the second calculation unit dynamically change accordingly. Thus, information relating to the second recommended route which is searched as a route to be recommended different from the first recommended route becomes more up-to-date than information relating to the first recommended route. Accordingly, there is an increasing advantage in providing information relating to the second recommended route as information different from the first recommended route.

In the above-described aspect, the predicted value output unit may count the number of times of the mobile object not following the output first recommended route or second recommended route for each of the first recommended route and the second recommended route, and may inhibit the guidance of a recommended route with the counted number of times equal to or greater than a predetermined value and the output of the prediction error range corresponding to the recommended route.

A user may want to receive the guidance of only one recommended route, like an existing navigation system or the like. From this point, according to the above-described aspect, when the user does not select the second recommended route a predetermined number of times or more, the user does not require the guidance of the second recommended route, and the provision of information relating to the second recommended route is limited. Accordingly, user's intention is further reflected in the necessity of the output of information relating to the second recommended route.

In the above-described aspect, when the calculation of the prediction error range is performed based on the movement patterns of a plurality of mobile objects, and when the divergence between the movement pattern used for the calculation and the movement pattern of a mobile object to be an output target of a prediction error range is equal to or greater than a predetermined value, the predicted value output unit may limit the output of a prediction error range for which it is determined that the divergence is equal to or greater than the predetermined value.

According to the above-described aspect, when the calculation of the prediction error range is performed based on the movement patterns of a plurality of mobile objects, and when the divergence between the movement pattern used for the calculation and the movement pattern of the mobile object to be the output target of the prediction error range is equal to or greater than the predetermined value, the output of the prediction error range, for which it is determined that the divergence is equal to or greater than the predetermined value, is limited. That is, when the movement patterns of a plurality of mobile objects used as so-called collective intelligence do not conform to the characteristic of the user, for example, the movement time, the arrival time, and the prediction error ranges calculated based on the collective intelligence are highly likely to be different from the movement time or the arrival time by the user.

From this point, according to the above-described aspect, when the divergence between the movement pattern used for calculation and the movement pattern of the mobile object to be the output target of the prediction error range is equal to or greater than the predetermined value, the output of the prediction error range, for which it is determined that the divergence is equal to or greater than the predetermined value, is limited, whereby there is no case where information generated based on elements not conforming to the characteristic of the user is output. In other words, only information generated based on elements conforming to the characteristic of the user is provided to the user.

A movement guidance device according to a third aspect of the invention guides a user with movement cost of a mobile object to a destination. The movement guidance device includes a first calculation unit which calculates a prediction error range of first movement cost of a first recommended route to the destination, a second calculation unit which calculates a prediction error range of second movement cost of a second recommended route, which is a route to the destination and includes one to a plurality of routes different from the first recommended route, for a point where the second recommended route is branched from the first recommended route, and a predicted value output unit which outputs the prediction error range of the second movement cost calculated by the second calculation unit based on whether or not the prediction error range calculated by the second calculation unit is smaller than the prediction error range calculated by the first calculation unit.

According to the above-described aspect, the prediction error range of movement cost for each of the first and second recommended routes is calculated. That is, variation in movement cost when the first recommended route is used and variation in movement cost when the second recommended route is used are calculated. Then, the output of the movement cost of the second recommended route or information relating to the prediction error range of the movement cost is performed through comparison for determination about whether or not variation in movement cost of the second recommended route is smaller than variation in movement cost of the first recommended route. Accordingly, there is no case where the calculated information relating to the first and second recommended routes are output in a random manner and guided to the user. With this, in the route guidance, the suitability of the output of movement cost with an error is increased.

In the above-described aspect, the movement cost may be at least one of the time necessary for the movement of the mobile object, the movement distance of the mobile object to the destination, the amount of consumption of fuel or energy of the mobile object, and the usage fee of a road of the mobile object.

As the movement cost, there are the time necessary for the movement of the mobile object, the movement distance of the mobile object to the destination, the amount of consumption of fuel of the mobile object or energy of an electric automobile or a hybrid automobile, the usage fee of a route of the mobile object, and the like. These movement costs are not necessarily limited to be constant, and may often include errors.

From this point, according to the above-described aspect, when these movement costs are output, determination is performed about whether or not the output of the prediction error range of movement cost of each of the first and second recommended routes is necessary based on comparison of the prediction error ranges of movement cost. Accordingly, the suitability of the output of various movement costs of each of the first and second recommended routes is increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A and 2B are diagrams showing an output example (pattern 1) when the user expects early arrival to a destination and when the latest time of a prediction error range of an arrival time of a second recommended route is earlier than the earliest time of a prediction error range of an arrival time of a first recommended route;

FIGS. 2C and 2D are diagrams showing an output example (pattern 2) when the user expects arrival to the destination within a predetermined range of a desired time and when the entire prediction error range of the arrival time of the second recommended route is included in the prediction error range of the arrival time of the first recommended route;

FIGS. 2E and 2F are diagrams showing an output example (pattern 3) when the user expects late arrival to the destination and when the earliest time of the prediction error range of the arrival time of the second recommended route is later than the latest time of the prediction error range of the arrival time of the first recommended route;

FIGS. 7A to 7C are diagrams showing an example of a determination aspect of the necessity of output using collective intelligence data concerning a second embodiment of a movement guidance device and a movement guidance method according to the invention;

FIGS. 8A and 8B are diagrams showing an example of a determination aspect of the degree of coincidence of collective intelligence data and personal data;

DETAILED DESCRIPTION OF EMBODIMENTS

First Embodiment

Hereinafter, a first embodiment which embodies a movement guidance device and a movement guidance method according to the invention will be described referring to FIGS. 1 to 6. The movement guidance device and the movement guidance method of this embodiment guides a route from a present place to a destination or movement cost to a user of a mobile object, such as a vehicle, or a user of a smartphone. The destination includes a point in a certain movement route, a destination estimated in a previous movement history of the user, and the like, in addition to a destination set by the user.

Figure 1:
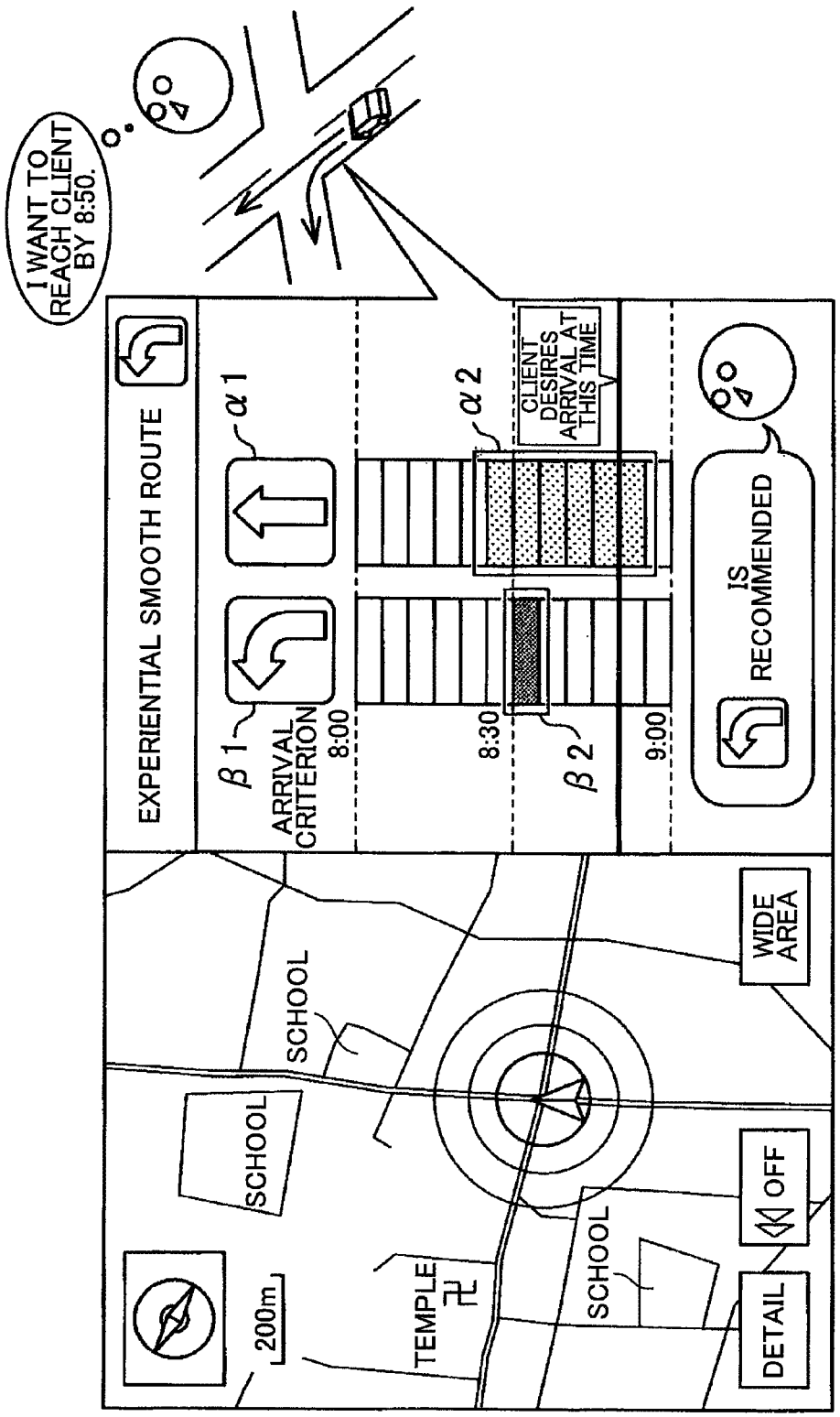
FIG. 1 is a diagram showing an example of an output aspect of a prediction error range of an arrival time of each of first and second recommended routes concerning a first embodiment of a movement guidance device and a movement guidance method according to the invention.

To begin with, as shown in FIG. 1, the movement guidance device and the movement guidance method of this embodiment perform a plurality of kinds of route guidance for the user through, for example, image display or voice guidance. The movement guidance device and the movement guidance method of this embodiment guides a prediction error range, which is a range of prediction including an error in predicted arrival time to the destination, in other words, variation in predicted arrival time to the user. The route guidance is performed, for example, when a mobile object reaches near an intersection or a branch road by a predetermined distance.

As shown in a region α1 of FIG. 1, for example, if a mobile object reaches a point near a certain intersection by a predetermined distance, the effect of passing straight through the intersection is guided as the guidance of a first recommended route calculated when a destination is specified. As shown in a region α2 of FIG. 1, the range "08:25" to "08:55" of a predicted arrival time to the destination when the user selects the first recommended route, that is, when the mobile object passes straight through the intersection is displayed. The guidance of the first recommended route is based on a route guidance function which is normally performed.

In the example shown in FIG. 1, for example, the user sets "09:00" as a desired arrival time. The desired arrival time is set based on, for example, information registered in an application or the like to be used by the user, information registered by the user, the behavior pattern of the user, and the like.

In this embodiment, as shown in a region β1 of FIG. 1, for example, if the mobile object reaches a point near a certain intersection by a predetermined distance, when there is a second recommended route which is another route with a small prediction error range, that is, small variation, the effect of turning left at the intersection to lead the user to the second recommended route is guided. In this embodiment, as shown in a region β2 of FIG. 1, the prediction error range "08:30" to "08:35" of a smooth route, which is the second recommended route branched from the middle of the first recommended route with variation smaller than the prediction error range of the first recommended route, is displayed. The second recommended route is a route for which a higher advantage than the first recommended route is estimated in displaying for the user.

With this, the user can easily perform determination about which of the recommended routes is selected with variation in predicted value of each of the first and second recommended routes. As shown in FIGS. 2A to 2F, the relationship between the prediction error ranges of the first and second recommended routes is primarily classified into three patterns depending on the user's request.

That is, as shown in FIG. 2A, when the user desires to arrive at the destination as early as possible, there is a high advantage for the user in displaying a recommended route having high probability capable of arriving at the destination early. Thus, as shown in a region βb of FIG. 2B as a pattern 1, since any time in the prediction error range of the second recommended route is earlier than any time in the prediction error range of the first recommended route shown in a region αb, there is an increasing advantage in guiding information relating to the second recommended route to the user. Accordingly, when the condition of the pattern 1 is established, the movement guidance device and the movement guidance method of this embodiment perform the output of information relating to the second recommended route. In this embodiment, information relating to the second recommended route and information relating to the first recommended route are displayed simultaneously on a display screen of a navigation system, an information terminal, or the like.

As shown in FIG. 2E, when the user desires to arrive at the destination as late as possible, there is a high advantage for the user in displaying a recommended route having high probability capable of arriving at the destination late. Accordingly, as shown in a region βf of FIG. 2F as a pattern 3, since any time in the prediction error range of the second recommended route is later than any time in the prediction error range of the first recommended route shown in a region αf, there is a high advantage in guiding information relating to the second recommended route to the user. Accordingly, even when the condition of the pattern 3 is established, the movement guidance device and the movement guidance method of this embodiment perform the output of information relating to the second recommended route.

As shown in FIG. 2C, when the user desires to arrive neither too early nor too late, there is an increasing advantage for the user in displaying a recommended route capable of arriving within a predetermined time from a desired time. However, as shown in a region βd of FIG. 2D as a pattern 2, the entire time of the prediction error range of the second recommended route is included in the prediction error range of the first recommended route shown in a region αd. For this reason, there are opposing possibilities that the mobile object arrives at the destination earlier when using first recommended route than when using the second recommended route and that the mobile object arrives at the destination later when using the first recommended route than when using the second recommended route.

Figure 3A:
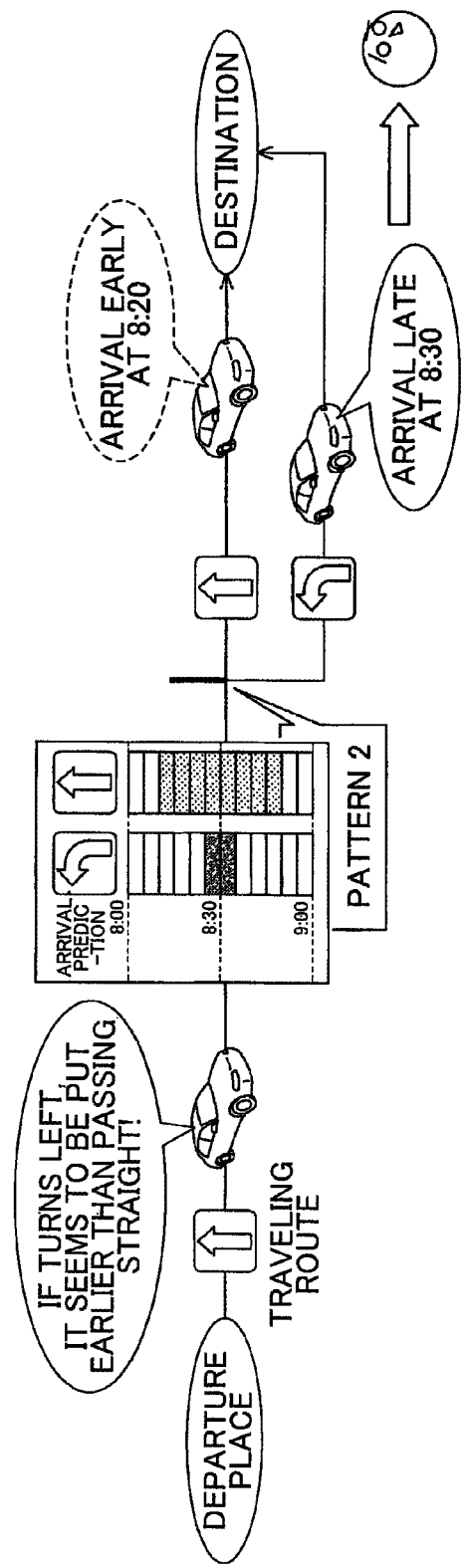
FIGS. 3A and 3B are diagrams showing an example of an arrival pattern in the output pattern 2.

For this reason, as shown in FIG. 3A, while the second recommended route of the pattern 2 is guided to the user who wants to arrive at the destination early, and the user selects the second recommended route having a predicted value "08:25" to "08:35" with relatively small variation, consequently, the user may arrive at the destination early when using the first recommended route. In this case, if the user selects the second recommended route, this does not conform to the user's request.

Figure 3B:
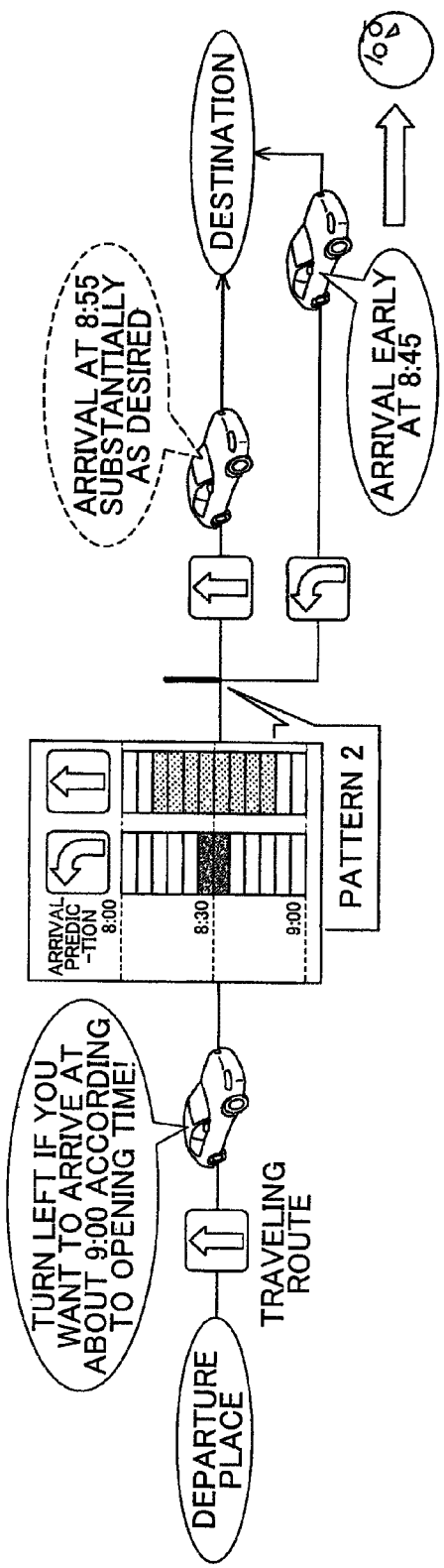

To the contrary, as shown in FIG. 3B, while the second recommended route of the pattern 2 is guided to the user who wants to arrive at the destination late, and the user selects the second recommended route having a predicted value "08:25" to "08:35" with relatively small variation, consequently, the user may arrive at the destination late when using the first recommended route. In this case, if the user selects the second recommended route, this does not conform to the user's request.

In this way, if information relating to the second recommended route is guided to the user in the scene of the pattern 2, it is advantageous or disadvantageous to the user. Accordingly, the movement guidance device and the movement guidance method of this embodiment guide information relating to each of the first and second recommended routes to the user when the conditions of the patterns 1 and 3 are established, and guide information relating to each of the first and second recommended routes to the user under a predetermined condition when the condition of the pattern 2 is established. In this embodiment, as the predetermined condition, for example, a condition that the calculation of information relating to the second recommended route is dynamically performed rather than the calculation of information relating to the first recommended route is defined. That is, a condition that information relating to the second recommended route is calculated at a higher frequency than information relating to the first recommended route is defined.

Figure 4A:
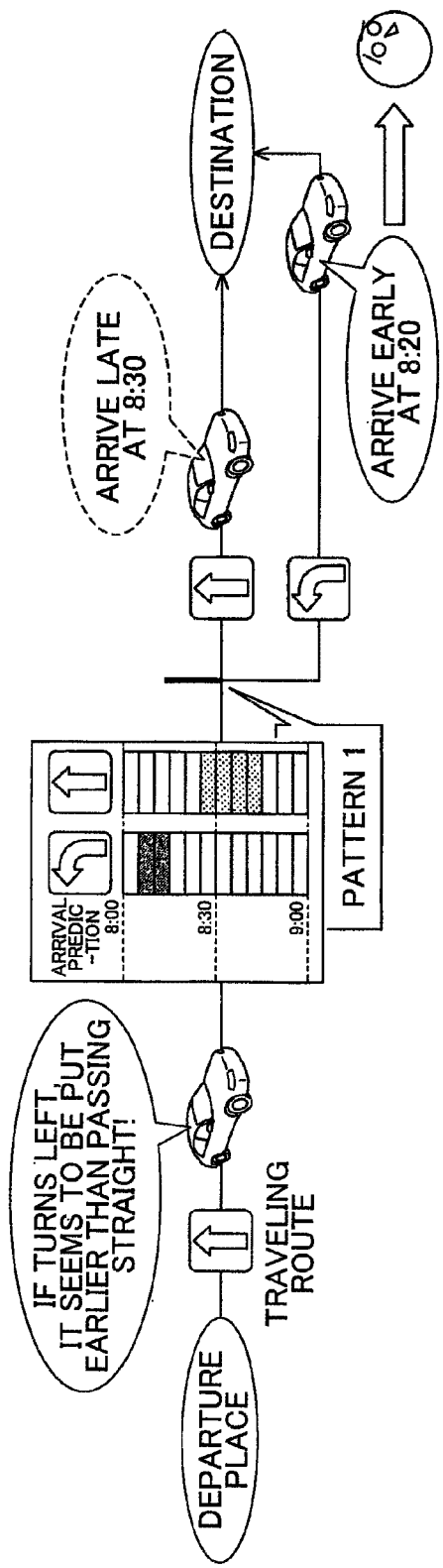
FIG. 4A is a diagram showing an example of an arrival pattern in the output pattern 1.

As shown in FIG. 4A, in case of the pattern 1, that is, when the user wants to arrive at the destination early, information relating to the second recommended route is guided to the user on the condition that the latest value of the predicted value of the second recommended route represents the time earlier than the earliest time of the predicted value of the first recommended route.

Figure 4B:
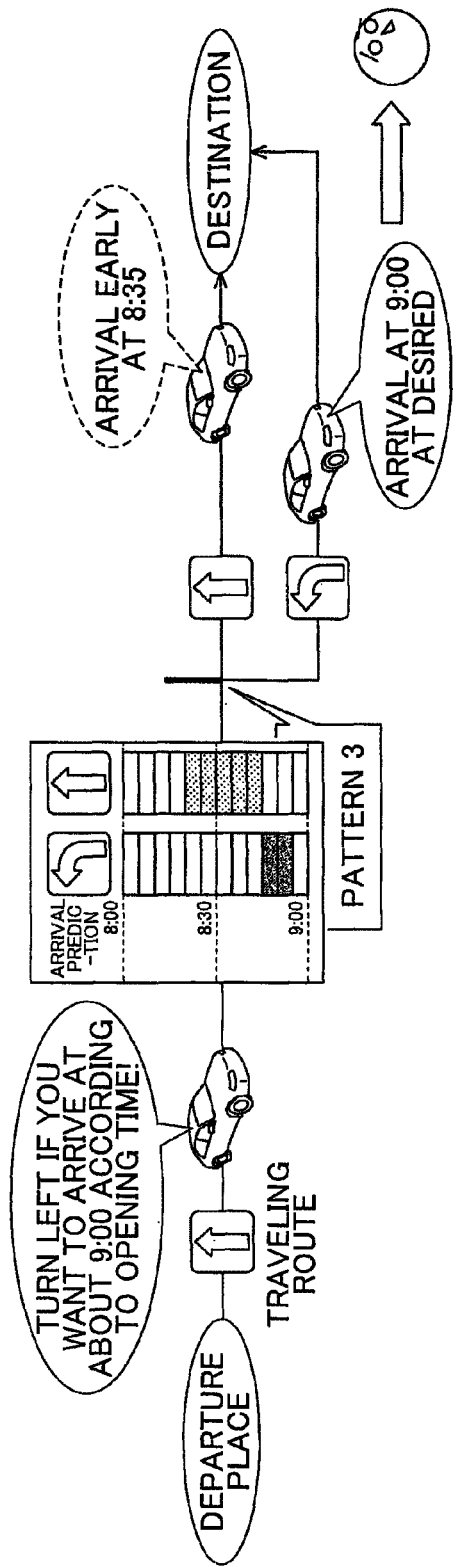
FIG. 4B is a diagram showing an example of an arrival pattern in the output pattern 3.

As shown in FIG. 4B, in case of the pattern 3, that is, when the user wants to arrive at the destination late, information relating to the second recommended route is guided to the user on the condition that the earliest value of the predicted value of the second recommended route represents the time later than the latest time of the predicted value of the first recommended route.

In this way, in this embodiment, in case of corresponding to the patterns 1 and 3, information relating to the second recommended route is guided to the user only when there is high probability of conforming to user's expectation. Hereinafter, the schematic configuration of an information terminal, to which the movement guidance device and the movement guidance method of this embodiment are applied, will be described referring to FIG. 5.

Figure 5:
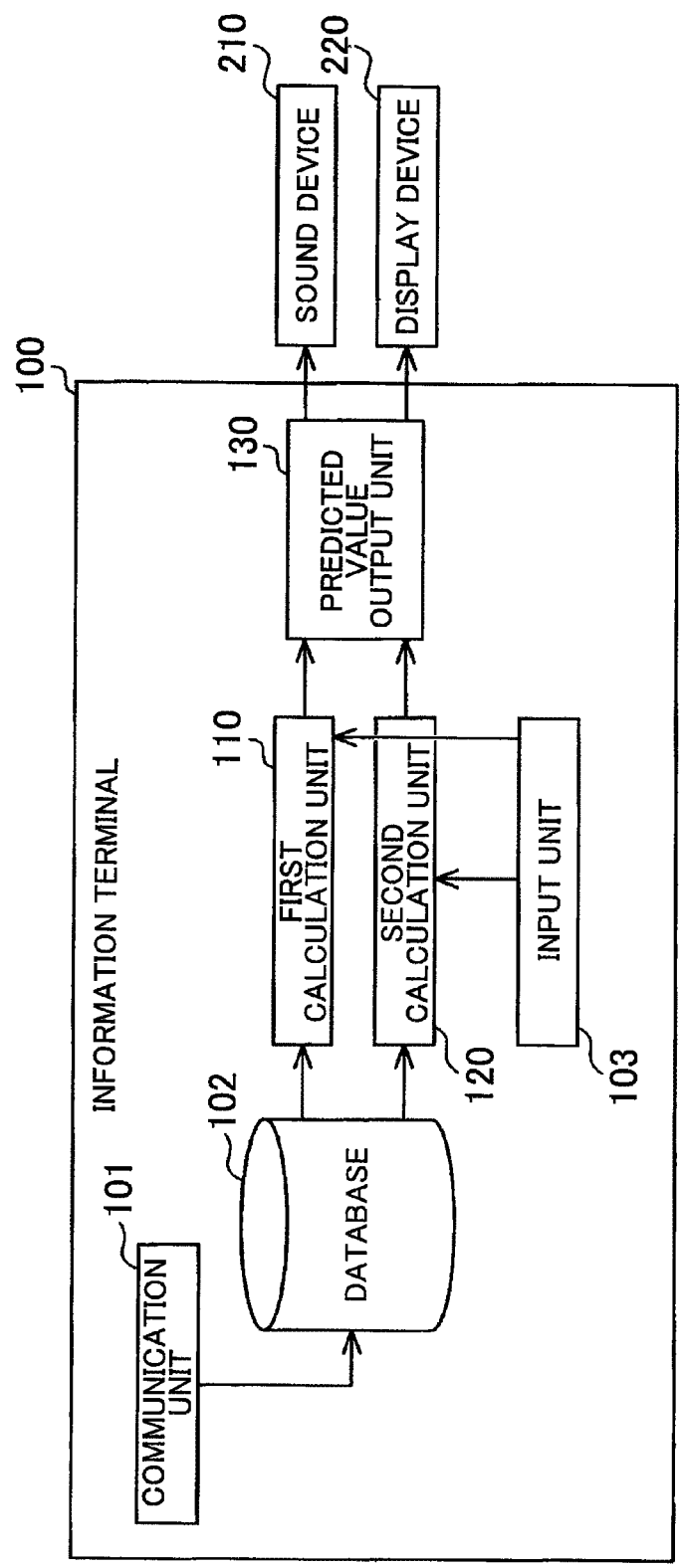
FIG. 5 is a block diagram showing the schematic configuration of an information terminal to which the movement guidance device and the movement guidance method of this embodiment are applied.

As shown in FIG. 5, an information terminal 100 of this embodiment is constituted by, for example, a navigation system which is used in a vehicle, a smartphone, or the like. The information terminal 100 has a communication unit 101 which performs communication with a road traffic information center or the like. The information terminal 100 also has a database 102 in which information acquired from the outside by the communication unit 101 is registered.

For example, the communication unit 101 acquires traffic information which is information necessary for calculating a movement time from the road traffic information center, and outputs the acquired traffic information to the database 102. The traffic information is information representing movement cost of each of the links, which are sections in terms of intersections, traffic signals, junctions, or the like.

The information terminal 100 of this embodiment also has a first calculation unit 110 which calculates a prediction error range of at least one of a first predicted arrival time and a first predicted movement time in a first recommended route. The information terminal 100 also has a second calculation unit 120 which calculates a prediction error range of at least one of a second predicted arrival time and a second predicted movement time in a second recommended route for each predetermined point. The information terminal 100 also has a predicted value output unit 130 which outputs the calculation results of the first calculation unit 110 and the second calculation unit 120 as the prediction error ranges.

For example, if a destination of the user is set through an input unit 103, the first calculation unit 110 refers to cost relating to a movement time among link costs, which are movement costs of the links registered in the database 102. Then, the first calculation unit 110 searches for the shortest route or shortest time route to the destination through, for example, a Dijkstra method. When a destination is not set, for example, the first calculation unit 110 estimates a destination based on the histories of destinations previously set, a present movement route, a time zone, and the like. Then, the first calculation unit 110 searches for a route to the estimated destination through, for example, a Dijkstra method.

The first calculation unit 110 calculates the range of a predicted movement time with an error in the searched route or the range of a predicted arrival time with an error to the destination when using the searched route as a prediction error range. Then, the searched route is set as a first recommended route, and information representing the first recommended route and the prediction error range is output to the predicted value output unit 130. The error of the predicted movement time or the predicted arrival time is calculated based on, for example, a congestion situation, a road characteristic, or the like represented by the traffic information.

For example, if the first recommended route is set and a vehicle, in which the information terminal 100 is used, starts to move, the second calculation unit 120 newly acquires traffic information through the communication unit 101 and the database 102 each time the vehicle arrives near an intersection or a junction by a predetermined distance. Then, the route from a present place of the vehicle to a destination is searched based on the acquired traffic information through, for example, a Dijkstra method. The second calculation unit 120 calculates a predicted arrival time and a predicted movement time when the searched route is used, and prediction error ranges which are errors of the predicted arrival time and the predicted movement time. Then, the second calculation unit 120 outputs the calculation result to the predicted value output unit 130 as information relating to a second recommended route at any time.

The predicted value output unit 130 of this embodiment performs the output of at least one of the second predicted arrival time and the second predicted movement time calculated by the second calculation unit 120 on the condition that the prediction error range calculated by the second calculation unit 120 is smaller than the prediction error range calculated by the first calculation unit 110.

The predicted value output unit 130 of this embodiment performs, as the output of the predicted value, one of controls: a: control for performing "no" output when the prediction error range calculated by the first calculation unit 110 and the prediction error range calculated by the second calculation unit 120 are equal to or greater than a predetermined range, that is, variation of each predicted value is equal to or greater than a predetermined amount, b: control for performing the output of the first recommended route and the output of at least only one of the first predicted arrival time and the first predicted movement time, c: control for performing the output of the second recommended route and the output of at least only one of the second predicted arrival time and the second predicted movement time, and d: control for performing the simultaneous output of at least one of the first predicted arrival time and the first predicted movement time and at least one of the second predicted arrival time and the second predicted movement time.

If information representing the prediction error ranges is input from the first calculation unit 110 and the second calculation unit 120, the predicted value output unit 130 compares the input prediction error ranges with each other. Next, the predicted value output unit 130 estimates the time, at which the user wants to arrive at the destination, based on, for example, schedule information registered in advance by the user of the information terminal 100 or the behavior pattern of the user. The predicted value output unit 130 determines one of the patterns 1 to 3, to which the relationship between each predicted value and the degree of expectation of the user corresponds, based on the estimation result and the prediction error ranges input from the first calculation unit 110 and the second calculation unit 120. Then, if it is determined that the relationship between each prediction error range and the degree of expectation of the user corresponds to the pattern 1 or the pattern 3, for example, the predicted value output unit 130 outputs information representing the direction guidance of each of the first and second recommended routes and information representing the predicted arrival time or the predicted movement time in each of the first and second recommended routes to a sound device 210 and a display device 220.

If it is determined that the relationship between each prediction error range and the degree of expectation of the user corresponds to the pattern 2, the predicted value output unit 130 performs determination about whether the degree of expectation of the user is early arrival or late arrival to the destination. This determination is performed based on schedule information registered in advance by the user of the information terminal 100 or the behavior pattern of the user.

Then, in the aspects illustrated in FIGS. 4A and 4B, the predicted value output unit 130 performs determination about whether or not the second prediction error range conforms to user's expectation rather than the first prediction error range. If it is determined that the second prediction error range conforms to the degree of expectation of the user rather than the first prediction error range, the predicted value output unit 130 outputs information relating to the second recommended route calculated by the second calculation unit 120 to the sound device 210 and the display device 220. An output destination of information relating to the first and second recommended routes may be one of the sound device 210 and the display device 220.

If information relating to the first or second recommended route is input from the predicted value output unit 130, the sound device 210 guides a course at an intersection or junction and the predicted arrival time or the predicted movement time with an error by sound. Similarly, if information relating to the first or second recommended route is input from the predicted value output unit 130, the display device 220 guides the course at the intersection or junction and the predicted arrival time or the predicted movement time with an error by an image of each of the aspects illustrated in FIGS. 1 to 4B.

Figure 6:
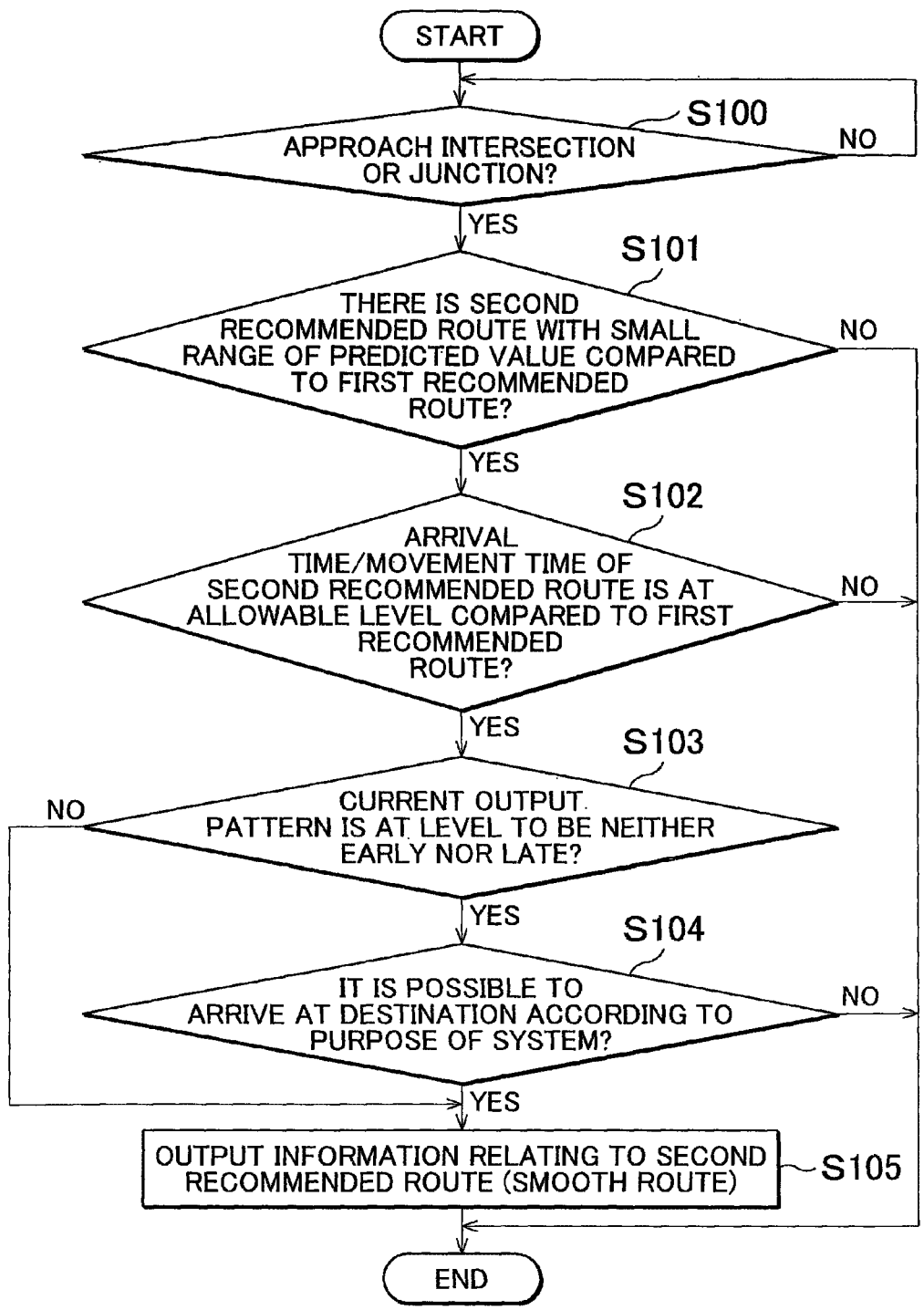
FIG. 6 is a flowchart showing an example of an output procedure of the prediction error range of the second recommended route of the movement guidance device and the movement guidance method of this embodiment.

Next, the action of the movement guidance device and the movement guidance method of this embodiment will be described referring to FIG. 6. As shown in FIG. 6, for example, if a vehicle, in which the information terminal 100 is used, reaches near an intersection or a junction by a predetermined distance (Step S100: YES), the predicted arrival time or the predicted movement time relating to one to a plurality of second recommended routes is calculated. Then, determination is performed about whether or not there is a second recommended route having a prediction error range smaller than the first recommended route, in other words, small variation (Step S101).

When there is a second recommended route with relatively small variation (Step S101: YES), determination is performed about whether or not the predicted arrival time or the predicted movement time of the second recommended route is at an allowable level compared to the first recommended route (Step S102). The determination about whether or not the predicted arrival time or the predicted movement time of the second recommended route is at an allowable level compared to the first recommended route is performed based on, for example, whether or not the difference from the predicted arrival time or the predicted movement time of the first recommended route is within a predetermined time, such as several minutes to tens of minutes.

If it is determined that the predicted arrival time or the predicted movement time of the second recommended route is at an allowable level (Step S102: YES), determination is performed about whether or not the relationship of the prediction error ranges of the first and second recommended routes corresponds to the pattern 2 (Step S103).

Then, if it is determined that the relationship of the prediction error ranges of the first and second recommended routes corresponds to the pattern 2 (Step S103: YES), determination is performed whether or not the predicted arrival time or the predicted movement time representing the predicted value of the second recommended route is according to the purpose of the information terminal 100 (Step S104). The purpose of the information terminal 100 is to execute processing conforming to user's intention.

If it is determined that the predicted arrival time or the predicted movement time conforms to user's intention (Step S104: YES), information relating to the prediction error range of the second recommended route of the pattern 2, that is, the predicted arrival time or predicted movement time with variation is output to the sound device 210 and the display device 220 (Step S105). At this time, only the prediction error range of the second recommended route may be output, and the prediction error ranges of the second and first recommended routes may be output simultaneously. Similarly, only information relating to the prediction error range may be output or information relating to the prediction error range and the route may be output simultaneously.

In Step S130, if it is determined that the relationship of the prediction error ranges of the first and second recommended routes corresponds to the pattern 1 or the pattern 3 (Step S103: NO), information relating to the prediction error range of the second recommended route of the pattern 2 corresponding to the pattern 1 or the pattern 3 is output to the sound device 210 and the display device 220 (Step S105). At this time, only the prediction error range of the second recommended route may be output or the prediction error ranges of the second and first recommended routes may be output simultaneously.

In Step S102, if it is determined that the predicted arrival time or the predicted movement time of the second recommended route is not at an allowable level (Step S102: NO), only information relating to the prediction error range of the first recommended route is output to the sound device 210 and the display device 220. For example, when it is determined that the predicted arrival time and the predicted movement time of the first recommended route are not at an allowable level, the output of information relating to the first recommended route may be limited.

As described above, according to the movement guidance device and the movement guidance method of this embodiment, the following effects are obtained. (1) The first calculation unit 110 calculates at least one of the prediction error range of the first predicted arrival time and the prediction error range of the first predicted movement time in the first recommended route. The second calculation unit 120 calculates at least one of the prediction error range of the second predicted arrival time and the prediction error range of the second predicted movement time in the second recommended route different from the first recommended route for a point where the second recommended route is branched from the first recommended route. The predicted value output unit 130 performs the output of at least one of the prediction error range of the second predicted arrival time and the prediction error range of the second predicted movement time based on whether or not the prediction error range of the second recommended route is smaller than the first prediction error range. For this reason, the output of information relating to the second recommended route is performed through comparison for determination about whether or not variation relating to the second recommended route is smaller than variation relating to the first recommended route. Accordingly, there is no case where the calculated information relating to the first and second recommended routes is output in a random manner and guided to the user. With this, in the route guidance, it is expected that the suitability of arrival prediction with an error or the output of the time until arrival is increased.

(2) The predicted value output unit 130 performs, as the output of the prediction error range, one of controls: a: control for performing "no" output when the prediction error range calculated by the first calculation unit 110 and the prediction error range calculated by the second calculation unit 120 are equal to or greater than a predetermined range, b: control for performing the output of at least only one of the prediction error ranges of the first predicted arrival time and the first predicted movement time when the prediction error range calculated by the first calculation unit 110 is smaller than the prediction error range calculated by the second calculation unit 120, and d: control for simultaneously performing the output of at least one of the prediction error ranges of the first predicted arrival time and the first predicted movement time and at least one of the prediction error ranges of the second predicted arrival time and the second predicted movement time. Thus, when the prediction error range relating to each of the first and second recommended routes is equal to or greater than a predetermined range and precision of the predicted arrival time or the predicted movement time is low, information relating to any recommended route is not output through the output control of "a". Accordingly, the output and guidance of low-precision information are not performed, whereby the provision of unreliable information to the user is suppressed. With this, a potential concern for the user is not caused by the guidance of unreliable information. When precision of information relating to the first recommended route is relatively high, information relating to the second recommended route as further guidance different from the first recommended route is not output and only information relating to the first recommended route is output through the output control of "b", whereby information with precision lower than information relating to the first recommended route is not guided in the middle of the guidance of information relating to the first recommended route. When the prediction error range of the second recommended route is smaller than the calculated prediction error range of the first recommended route, information relating to the respective first and second recommended routes is output through the output control of "d". For this reason, for example, when the first recommended route which is searched for normal guidance is constantly guided to the user, and high-precision information relating to the second recommended route having the prediction error range smaller than the first recommended route is obtained, information relating to the second recommended route is also guided to the user. Accordingly, it becomes possible for the user to recognize two kinds of information relating to the respective first and second recommended routes.

(3) For example, in Step S102 of FIG. 6, when it is determined that a predetermined condition is not established for the second recommended route through comparison with the first recommended route, for example, when the arrival time or the movement time has a difference equal to or greater than a predetermined value compared to the first recommended route, the predicted value output unit 130 limits the output of the prediction error range calculated by the second calculation unit 120. Accordingly, from a viewpoint other than the prediction error range, output is performed taking into consideration advantages and disadvantages for information relating to the first and second recommended routes.

(4) The second calculation unit 120 calculates the prediction error range in terms of intersections or branch roads. The predicted value output unit 130 performs the output of the prediction error range each time the vehicle reaches a position near a predetermined point by a predetermined distance. With this, the up-to-date prediction error range of the second recommended route is compared with the prediction error range of the first recommended route, whereby the necessity of the output of information relating to the second recommended route is dynamically determined.

(5) The second calculation unit 120 acquires traffic information at a relatively high frequency compared to the first calculation unit 110 and dynamically calculates the prediction error range based on the acquired traffic information. For this reason, for example, if a traffic flow changes depending on congestion or a time zone, the movement time, the arrival time, and the prediction error ranges of the movement time and the arrival time of the second recommended route calculated by the second calculation unit 120 dynamically change accordingly. Thus, information relating to the second recommended route which is searched as a route to be recommended different from the first recommended route becomes more up-to-date than information relating to the first recommended route. Accordingly, there is an increasing advantage in providing information relating to the second recommended route as information different from the first recommended route.

Second Embodiment

Next, a second embodiment of a movement guidance device and a movement guidance method according to the invention will be described referring to FIGS. 7A to 12 focusing on a difference from the first embodiment. The movement guidance device and the movement guidance method of this embodiment have the basic configuration as in the first embodiment. In FIGS. 7A to 12, the substantially same elements as those in the first embodiment are represented by the same reference numerals, and overlapping description will be omitted.

As shown in FIGS. 7A to 7C, the predicted value output unit 130 of this embodiment has a database for using the movement histories of a plurality of users or the like as collective intelligence. The second calculation unit 120 of this embodiment calculates the movement time, the arrival time, and the prediction error ranges of the movement time and the arrival time of the second recommended route based on the movement time on each route registered in the database. For example, the database may be provided in a center which can perform communication with the communication unit 101 of the information terminal 100.

As shown in FIG. 7A, for example, the database has, as a database for collective intelligence collected from a plurality of vehicles, database 10 in which information relating to a plurality of movement times on each route for respective vehicle types is registered, a database 11 in which information relating to a plurality of movement times on each route by skill of the users of the vehicles, and a database 12 in which information relating to a plurality of movement times on each route by traveling environment of the vehicles.

In the database 10 for vehicle factors of collective intelligence, for example, a plurality of kinds of information relating to the movement times in terms of links are registered for each vehicle type. In the database 11 for user factors of collective intelligence, for example, user's skills are classified into three of "skill: high", "skill: intermediate", and "skill: low", and a plurality of kinds of information relating to the movement times of the respective skills are registered in terms of links. In the database 12 for traveling environments of collective intelligence, for example, a plurality of kinds of information relating to the movement times by weather, for each degree of congestion, for each area, for each time zone, or the like are registered in terms of links.

As shown in FIG. 7B, the database has, as a personal database collected from the information terminal 100, a database 20 in which information relating to a vehicle, in which the information terminal 100 is used, is registered, a database 21 in which information relating to the user of the vehicle is registered, and a database 22 in which information relating to the traveling environment of the vehicle is registered. As information relating to the vehicle, the type of vehicle in which the information terminal 100 is used is registered. As information relating to the user, for example, information representing a specified skill among "skill: high", "skill: intermediate", and "skill: low" is registered. As information relating to the traveling environment of the vehicle, information relating to weather, the degree of congestion, an area, and a time zone of the vehicle, in which the information terminal 100 is used, every time is registered.

As shown in FIG. 7C, the predicted value output unit 130 compares information of the user of the information terminal 100 with information registered as collective intelligence by vehicle factor, user factor (driver factor), and traveling environment factor. Then, the predicted value output unit 130 calculates the degree of coincidence from the comparison result. The predicted value output unit 130 multiplies a predetermined coefficient according to the degree of coincidence, and calculates, for example, the degree of coincidence "1.0" of the vehicle factor, the degree of coincidence "0.0" of the user factor, and the degree of coincidence "1.5" of the traveling environment. Then, the predicted value output unit 130 performs determination about whether or not the total value "2.5" of the calculated degrees of coincidence reaches a predetermined reference value.

Only when it is determined that the total value of the respective degrees of coincidence reaches the predetermined reference value, the predicted value output unit 130 performs the output of the information relating to the second recommended route calculated by the second calculation unit 120. With this, in this embodiment, while information collected as collective intelligence is used, only when the degree of coincidence is high, in other words, only when precision of the movement time is high, information relating to the second recommended route is output and guided to the user. Accordingly, only information relating to the second recommended route with higher precision is guided to the user.

FIGS. 8A and 8B show a comparison aspect of collective intelligence data and personal data of the user. As shown in these drawings, for example, when a comparison target is the driving skill of the user, collective intelligence data is analyzed, and as the driving skill is high, it is determined that it is possible to arrive at the destination relatively early (FIG. 8A). Next, as shown in FIG. 8B, even though the driving skill of the user is "high", when the driving tendency of the user is different from the distribution of collective intelligence data of the driving skill "high", collective intelligence data does not conform to the driving tendency of the user. Accordingly, at this time, for example, even though the driving skill conforms, there is a higher probability that the arrival time or the movement time calculated based on collective intelligence data does not conform to the arrival time or movement time of the user.

Figure 9:
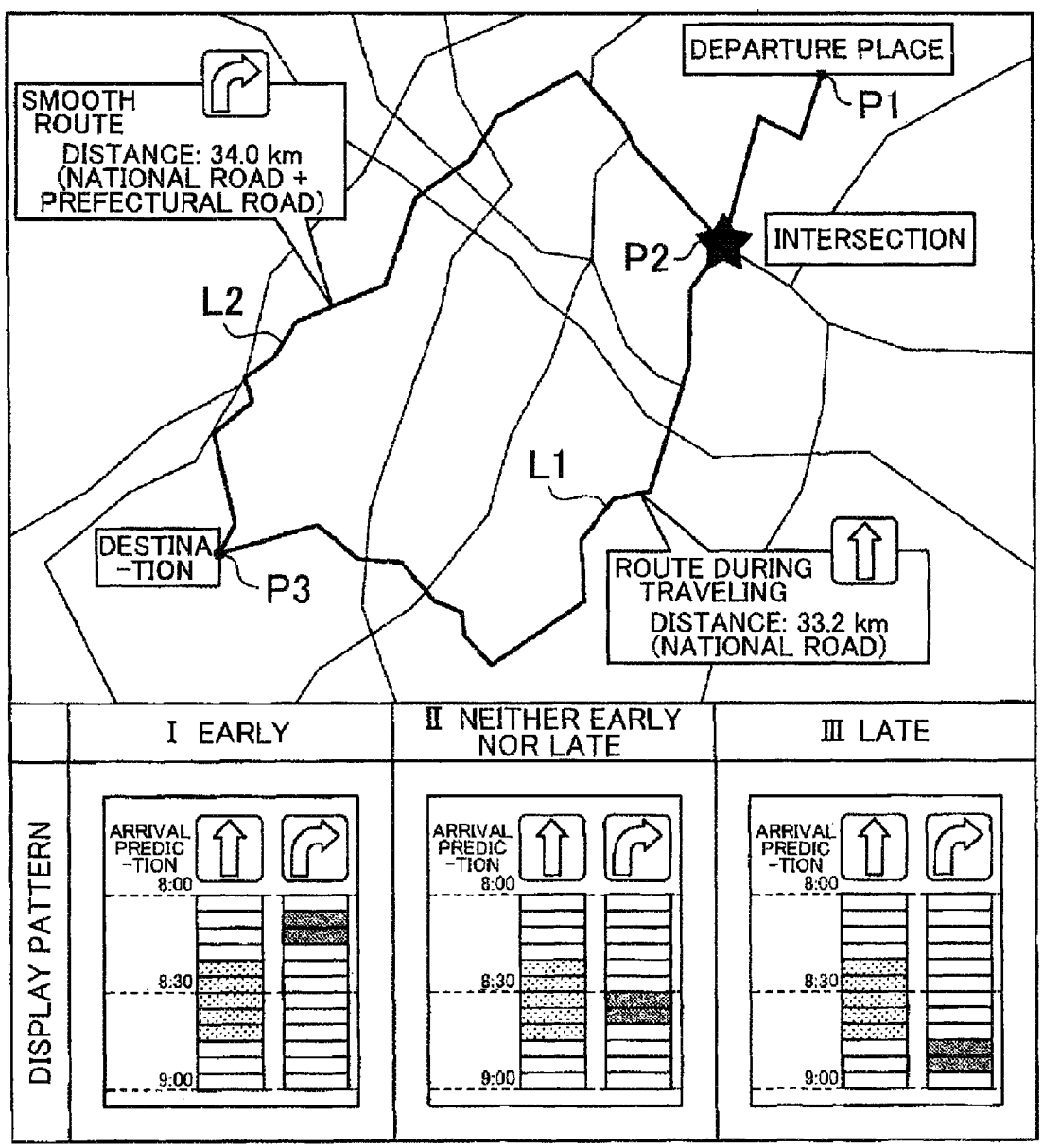
FIG. 9 is a diagram showing a search example of a route of this embodiment.

As shown in FIG. 9, for example, it is assumed that a user with a low level of driving skill drives a heavy vehicle from a present place P1 toward a destination P3 on a rainy condition at night on a weekday. Here, for example, if the vehicle reaches a point near the intersection P2 by a predetermined distance, when there is a second recommended route L2 which is a route different from the first recommended route L1 hitherto guided and branched from the intersection P2, the predicted value output unit 130 guides the second recommended route L2. The second recommended route L2 has variation of the predicted arrival time and the predicted movement time smaller than the first recommended route L1.

Figure 10:
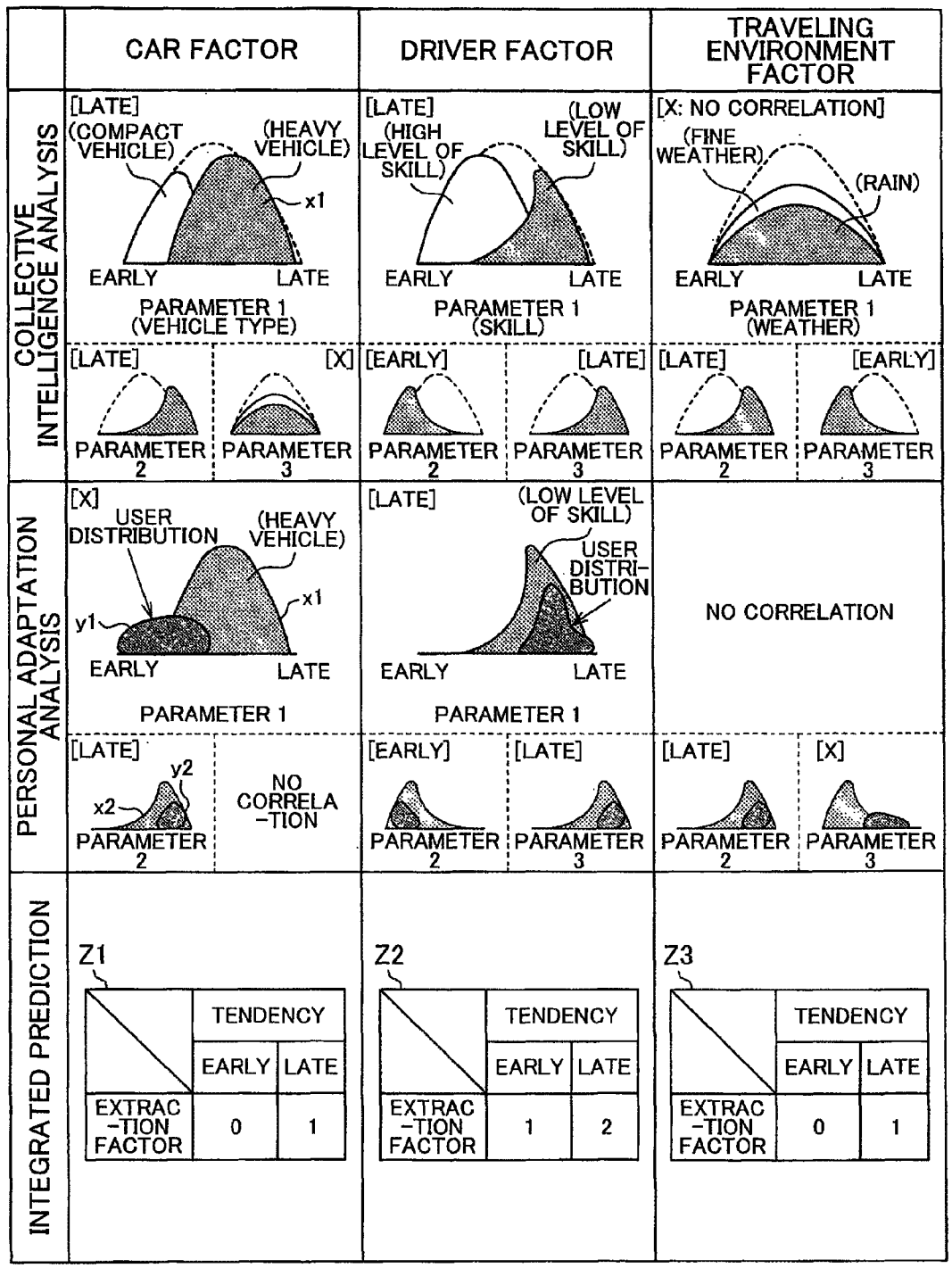
FIG. 10 is a diagram showing an example of an analysis aspect of the degree of coincidence of collective intelligence data to be analyzed by factor and personal data.

Here, when the prediction range of the second recommended route L2 corresponds to the pattern 2, determination is performed about whether or not the second recommended route L2 conforms to user's expectation. As shown in FIG. 10, in this embodiment, during the determination, since variation of the arrival time (movement time) in the first recommended route L1 is wide, in order to recognize whether arrival is early or late, collective intelligence analysis based on the behaviors of a plurality of users, personal adaptation analysis, which is analysis of the characteristic of the user, to which a service is provided, and integrated prediction, which is integrated analysis based on collective intelligence analysis and personal adaptation analysis, are performed. In the collective intelligence analysis, for example, a factor which has an influence on the predicted arrival time and the predicted movement time is specified for each vehicle factor, each user factor, and for each traveling factor. Each factor is divided into a plurality of parameters. In this example, the vehicle type of a parameter 1 among the vehicle factors and the skill among the user factors has a relatively large influence on the predicted arrival time and the predicted movement time. The influence of weather among the traveling factors is relatively small.

In the collective intelligence analysis for the parameter 1 of the vehicle type, a heavy vehicle has a tendency that the arrival time becomes relatively late and the movement time becomes relatively long. To the contrary, a compact vehicle has a tendency that the arrival time becomes relatively early and the movement time becomes relatively short. For example, according to a parameter 2 defined as the model year of the vehicle, for example, there is a tendency that, as the model year is old, the arrival time becomes relatively late and the movement time becomes relatively long. For example, according to the parameter 2 defined as the model year of the vehicle, for example, there is a tendency that, as the model year is old, the arrival time becomes relatively late and the movement time becomes relatively long. According to a parameter 3 defined as the manufacturer of the vehicle, even though a manufacturer is different, there is no change in arrival time or movement time, and there is no correlation between the manufacturer and the arrival time and the movement time. Accordingly, the parameters 1 and 2 are selected among the vehicle factors as a comparison target with the characteristic of the user through the collective intelligence analysis.

In the user characteristic analysis, if it is assumed that a vehicle which is used by the user is a heavy vehicle and has a characteristic represented as a distribution y1, the distribution y1 is compared with a general distribution x1 of a heavy vehicle represented by collective intelligence data. However, in this example, while the vehicle type is common, the distribution y1 of the user is diverged from the distribution x1 represented by collective intelligence data, and it is determined that the degree of coincidence is "low". For this reason, in the determination of the prediction error range of the arrival time (predicted arrival time) or the movement time (predicted movement time), the parameter 1 which is the vehicle type among collective intelligence data relating to the vehicle factors is excluded from an analysis target.

To the contrary, in regards to the parameter 2 among the vehicle factors, the tendency of a distribution x2 of collective intelligence data is similar to the tendency of a distribution y2 of the user. For this reason, the degree of coincidence of the characteristic of collective intelligence data and the characteristic of the user is high, and in the guidance of the arrival time or the movement time to the user, analysis using data relating to the parameter 2 among collective data of the vehicle factors is valid. In this way, as shown as Table z1 in FIG. 10, there is a high possibility that the arrival time calculated from collective intelligence data based on the vehicle factors is relatively late compared to an average value, and the movement time is required to be relatively long.

In FIG. 10, a result obtained from the degree of coincidence with the respective parameters 1 to 3 is shown as Table z2. As shown in the drawing, it is predicted that the arrival time which is predicted according to collective intelligence data based on the factor of the user and the user characteristic becomes relatively late. Similarly, it is predicted that the movement time which is predicted according to collective intelligence data based on the factor of the user and the user characteristic becomes relatively long.

In FIG. 10, a result obtained from the degree of coincidence with the respective parameters 1 to 3 is shown as Table z3. As shown in the drawing, it is predicted that the arrival time which is predicted according to collective intelligence data based on the factor of the traveling environment and the user characteristic becomes relatively late. Similarly, it is predicted that the movement time which is predicted according to collective intelligence data based on the factor of the user and the user characteristic becomes relatively long.

Through this analysis, the totals of the tendencies of relative "early" and "late" (relative "short" and "long" of the movement time) of the arrival time obtained for each of the parameters 1 to 3 of each factor are required to respectively represent "early: 1" and "late: 4". Accordingly, it is possible to confirm that there is high probability that the arrival time calculated based on collective intelligence data becomes later than the average time according to each factor or the degree of coincidence of collective data and the characteristic of the user, and there is high probability that the movement time calculated based on collective intelligence data becomes longer than the average time.

Accordingly, for example, when the user desires to arrive at the destination earlier than scheduled, since it is predicted that the first recommended route becomes late through the current analysis, the predicted value output unit 130 of this embodiment determines that the arrival time (predicted arrival time) or the movement time (predicted movement time) of the second recommended route calculated based on collective intelligence data conforms to user's intention based on this characteristic. Then, the predicted value output unit 130 performs the output of information relating to the calculated arrival time (predicted arrival time) or the movement time (predicted movement time) of the second recommended route.

With this, while the arrival time or the movement time is calculated using collective intelligence data based on information of an unspecified number of users, the necessity of the output of information relating to the second recommended route is determined based on the tendency of the user, the factors having an influence on the arrival time and the movement time, and the like, whereby the determination on the necessity of the output further conforms to the characteristic of the user. That is, it is expected that the necessity of the output of information relating to the second recommended route further conforms to the desire of the user.

Figure 11:
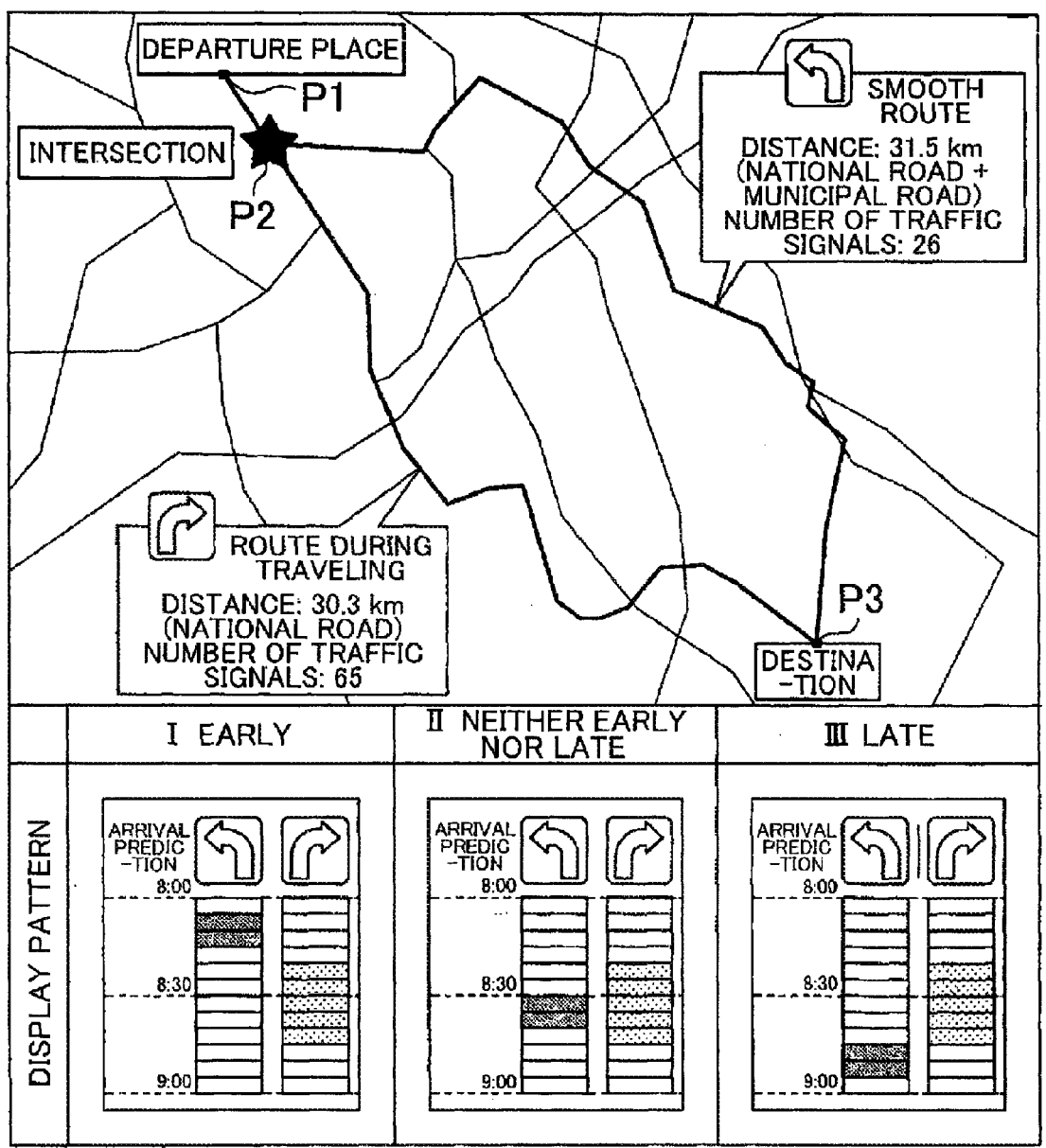
FIG. 11 is a diagram showing a search example of a route of this embodiment.
Figure 12:
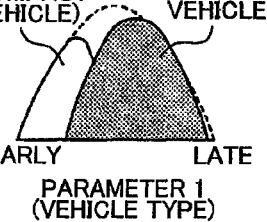
FIG. 12 is a diagram showing an example of an analysis aspect of the degree of coincidence of collective intelligence data to be analyzed by factor and personal data.

As shown in FIG. 11, when a user who is located at a point P1 desires to arrive at a destination P3 late, for example, the presence/absence of a second recommended route according to the desire of the user near an intersection P2 in the middle of the first recommended route by a predetermined distance is determined. In the determination, as shown in FIG. 12, the tendency of lateness or earliness of the arrival time or the tendency of the length of the movement time for the first recommended route having large variation of the arrival time (movement time) is determined based on the degree of coincidence of the characteristic of collective intelligence data and the characteristic of the user and the correlation between each parameter and the arrival time or the movement time. In this example, when the user selects the first recommended route, there is a tendency that the arrival time is relatively late and there is a tendency that the movement time becomes relatively long. Accordingly, in the example of FIGS. 11 and 12, since the second recommended route does not conform to the request of the user who desires to arrive at the destination late since there is high probability of arriving early, even though there is the second recommended route which is branched from the intersection P2, the output of information relating to the second recommended route is not performed. That is, the output of information relating to the second recommended route is limited, and the output of only information relating to the first recommended route is performed.

As described above, according to the movement guidance device and the movement guidance method of this embodiment, the effects of (1) to (5) are obtained, and the following effects are also obtained.

(6) Collective intelligence database is used when calculating information relating to the second recommended route. For this reason, information relating to the second recommended route is calculated based on the movement time of a vehicle which travels on an actual road, or the like, instead of traffic information calculated by the road traffic information center or the like in an undifferentiated manner. Accordingly, the predicted arrival time or the predicted movement time is calculated based on the actual movement time, and variation of the predicted arrival time or the predicted movement time is calculated with higher precision.

(7) The degree of coincidence of the characteristic of collective intelligence data and the characteristic of the user is included when calculating information relating to the second recommended route based on collective intelligence. For this reason, information relating to the second recommended route is calculated based on collective intelligence data having a higher degree of coincidence. Accordingly, the predicted arrival time or predicted movement time closer to the characteristic of the user is calculated.

Third Embodiment

Figure 13:
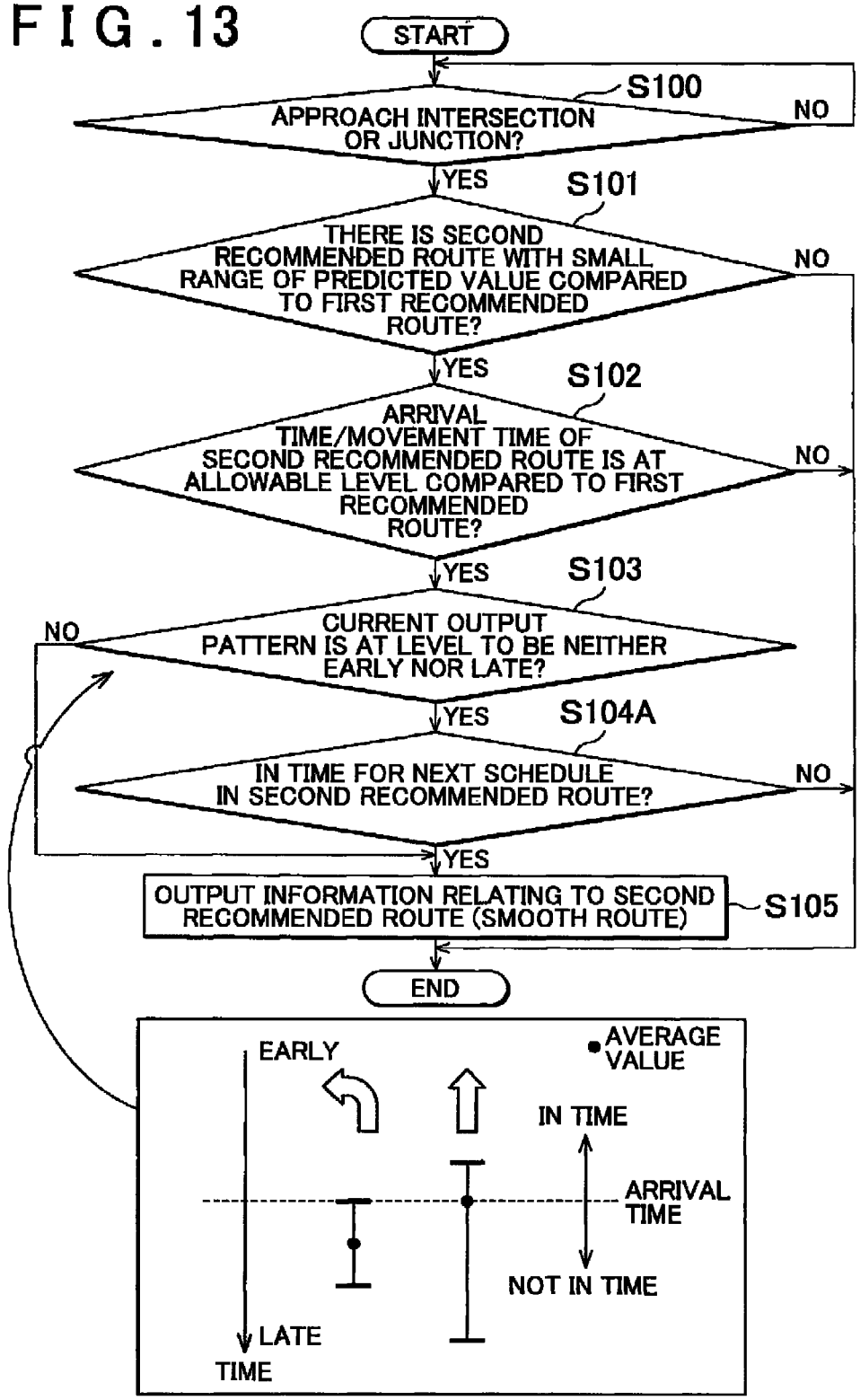
FIG. 13 is a flowchart showing an output procedure of a prediction error range of a recommended route concerning a third embodiment of a movement guidance device and a movement guidance method according to the invention.

Next, a third embodiment of a movement guidance device and a movement guidance method according to the invention will be described referring to FIG. 13 corresponding to FIG. 6 focusing on a difference from the first embodiment. The movement guidance device and the movement guidance method of this embodiment have the basic configuration as in the first embodiment. In FIG. 13, the substantially same elements as those in the first embodiment are represented by the same reference numerals, and overlapping description will be omitted.

As shown in FIG. 13, when it is determined that the output pattern of information relating to the second recommended route corresponds to the pattern 2 (Step S103: YES), even though the second recommended route is used, the predicted value output unit 130 of this embodiment performs determination about whether or not the user is in time for a planned schedule after arrival at the destination (Step S104A). The determination is performed based on, for example, schedule information input in advance to the information terminal 100 or the behavior pattern of the user.

Then, if it is determined that the user is in time for the schedule (Step S104A: YES), information relating to the second recommended route is output (Step S105). If it is determined that the user is not in time for the schedule (Step S104A: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(8) Information relating to the second recommended route is guided based on the schedule of the user after arrival at the destination. For this reason, only when it is in time for the next schedule of the user, information relating to the second recommended route is guided. Accordingly, information relating to the second recommended route conforming to the next schedule of the user is guided.

Fourth Embodiment

Figure 14:
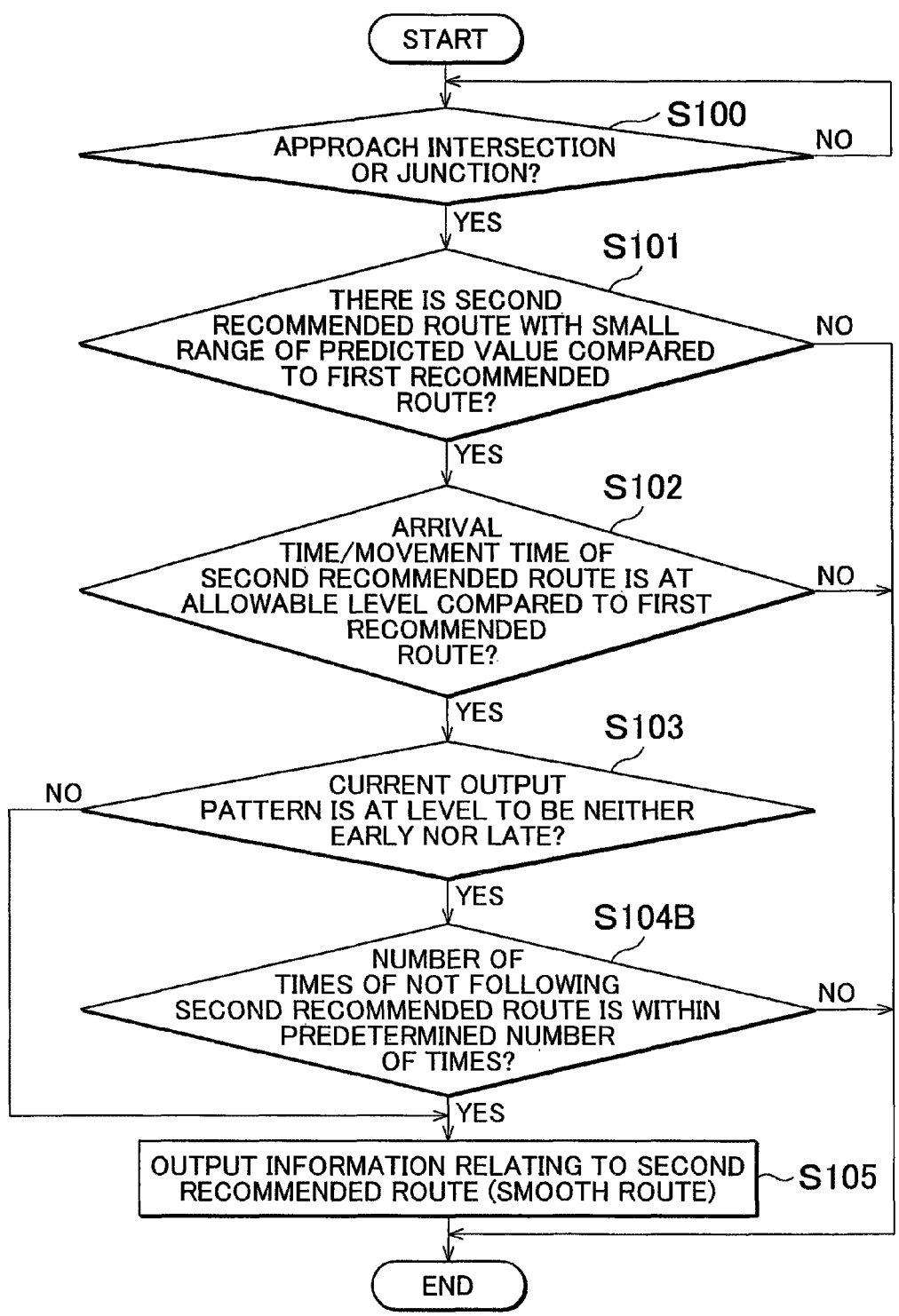
FIG. 14 is a flowchart showing an output procedure of a prediction error range of a recommended route concerning a fourth embodiment of a movement guidance device and a movement guidance method according to the invention.

Next, a fourth embodiment of a movement guidance device and a movement guidance method according to the invention will be described referring to FIG. 14 corresponding to FIG. 6 focusing on a difference from the first embodiment. The movement guidance device and the movement guidance method of this embodiment have the basic configuration as in the first embodiment. In FIG. 14, the substantially same elements as those in the first embodiment are represented by the same reference numerals, and overlapping description will be omitted.

The predicted value output unit 130 of this embodiment counts the number of times of the user not following the output information relating to the second recommended route. Then, the necessity of the output of information relating to the second recommended route is determined based on the number of times of following the output information to be the count result.

That is, as shown in FIG. 14, when it is determined that the output pattern of information relating to the second recommended route corresponds to the pattern 2 (Step S103: YES), the predicted value output unit 130 of this embodiment performs determination about whether or not the counted number of times is within a predetermined number of times (Step S104B).

Then, if it is determined that the counted number of times is within the predetermined number of times (Step S104B: YES), information relating to the second recommended route is output (Step S105). If it is determined that the counted number of times exceeds the predetermined number of times (Step S104B: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(9) The necessity of the output of information relating to the second recommended route is determined based on whether or not the user follows the guidance relating to the second recommended route. For this reason, when the number of times of the user not following the guidance relating to the second recommended route is equal to or less than the predetermined number of times, in other words, as the ratio of the user following the guidance relating to the second recommended route is high, usefulness of information relating to the second recommended route is high, and information relating to the second recommended route is output. To the contrary, when the number of times of the user not following the guidance relating to the second recommended route exceeds the predetermined number of times, in other words, as the ratio of the user not following the guidance relating to the second recommended route is high, usefulness of information relating to the second recommended route is low, and information relating to the second recommended route is not output. Accordingly, information according to the necessity of information relating to the second recommended route for the users is provided.

Fifth Embodiment

Figure 15:
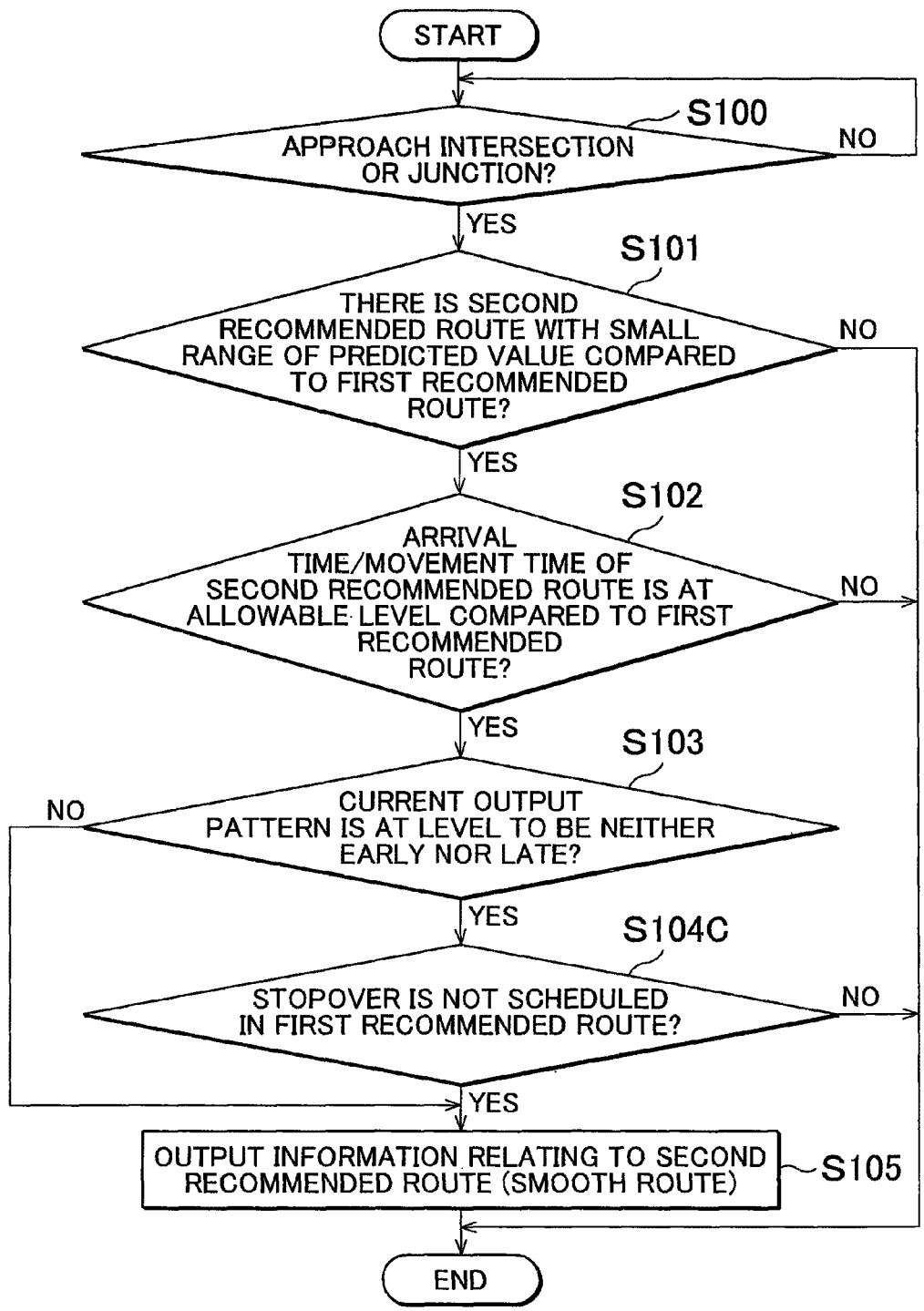
FIG. 15 is a flowchart showing an output procedure of a prediction error range of a recommended route concerning a fifth embodiment of a movement guidance device and a movement guidance method according to the invention.

Next, a fifth embodiment of a movement guidance device and a movement guidance method according to the invention will be described referring to FIG. 15 corresponding to FIG. 6 focusing on a difference from the first embodiment. The movement guidance device and the movement guidance method of this embodiment have the basic configuration as in the first embodiment. In FIG. 15, the substantially same elements as those in the first embodiment are represented by the same reference numerals, and overlapping description will be omitted.

The predicted value output unit 130 of this embodiment determines the necessity of the output of information relating to the second recommended route based on whether or not there is a point where a stopover of the user is estimated in a recommended route to be guided. The presence/absence of a point where a stopover of the user is estimated is specified based on, for example, a previous stopover point of the user, schedule information of the user, or the like.

That is, as shown in FIG. 15, when it is determined that the output pattern of information relating to the second recommended route corresponds to the pattern 2 (Step S103: YES), the predicted value output unit 130 of this embodiment performs determination about whether or not there is a point where a stopover is predicted in the first recommended route (Step S104C).

Then, if it is determined that there is no point where a stopover is predicted in the first recommended route (Step S104C: YES), information relating to the second recommended route is output (Step S105). If it is determined that there is a point where a stopover is predicted in the first recommended route (Step S104C: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(10) The necessity of the output of information relating to the second recommended route is determined based on whether or not there is a point where a stopover is predicted in the first recommended route. For this reason, when there is a point where the user plans to stop over in the first recommended route, in other words, when there is a high probability that the user selects the first recommended route, usefulness of the second recommended route is low and the output of information relating to the second recommended route is limited. Accordingly, a potential concern for the user is not caused by the provision of less-useful information to the user.

Sixth Embodiment

Figure 16:
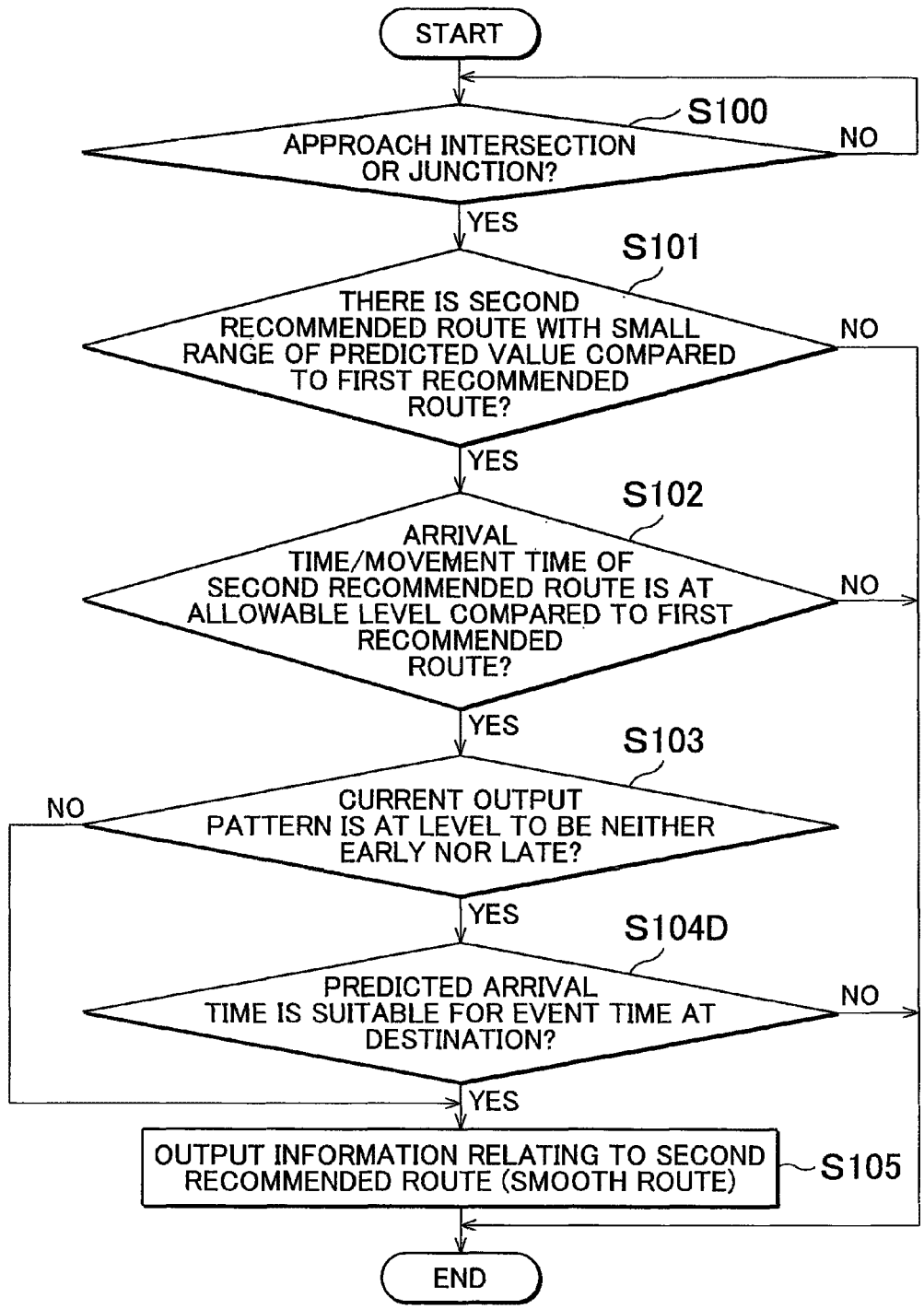
FIG. 16 is a flowchart showing an output procedure of a prediction error range of a recommended route concerning a sixth embodiment of a movement guidance device and a movement guidance method according to the invention.

Next, a sixth embodiment of a movement guidance device and a movement guidance method according to the invention will be described referring to FIG. 16 corresponding to FIG. 6 focusing on a difference from the first embodiment. The movement guidance device and the movement guidance method of this embodiment have the basic configuration as in the first embodiment. In FIG. 16, the substantially same elements as those in the first embodiment are represented by the same reference numerals, and overlapping description will be omitted.

The predicted value output unit 130 of this embodiment performs determination about the necessity of the output of information relating to the second recommended route based on whether or not it is suitable for an event time at the destination. As the event time, for example, when the user has an appointment or the like with a third party at the destination, the time at which the third party arrives at the destination or an appointment time is set. When the time at which the third party arrives at the destination changes, the time after change is updated as the event time. As the event time, when an event, such as a performance, occurs at the destination in a predetermined time zone, the time zone is set.

Here, as shown in FIG. 15, when it is determined that the output pattern of information relating to the second recommended route corresponds to the pattern 2 (Step S103: YES), the predicted value output unit 130 of this embodiment performs determination about whether or not the predicted arrival time when the second recommended route is used is suitable for the event time at the destination (Step S104D). In this example, determination about whether or not it is suitable for the event time is performed based on whether or not the prediction error range of the predicted arrival time of the second recommended route is included in the event time or is several minutes or tens of minutes before the event time.

Then, if it is determined that the predicted arrival time when the second recommended route is used is suitable for the event time at the destination (Step S104D: YES), information relating to the second recommended route is output (Step S105). If it is determined that the predicted arrival time when the second recommended route is used is not suitable for the event time at the destination (Step S104D: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(11) The necessity of the output of information relating to the second recommended route is determined based on whether or not the predicted arrival time when the second recommended route is used is suitable for the event time at the destination. For this reason, the necessity of information relating to the second recommended route is determined according to the event time at the destination, and the output of information relating to the second recommended route is performed.

Seventh Embodiment

Figure 17:
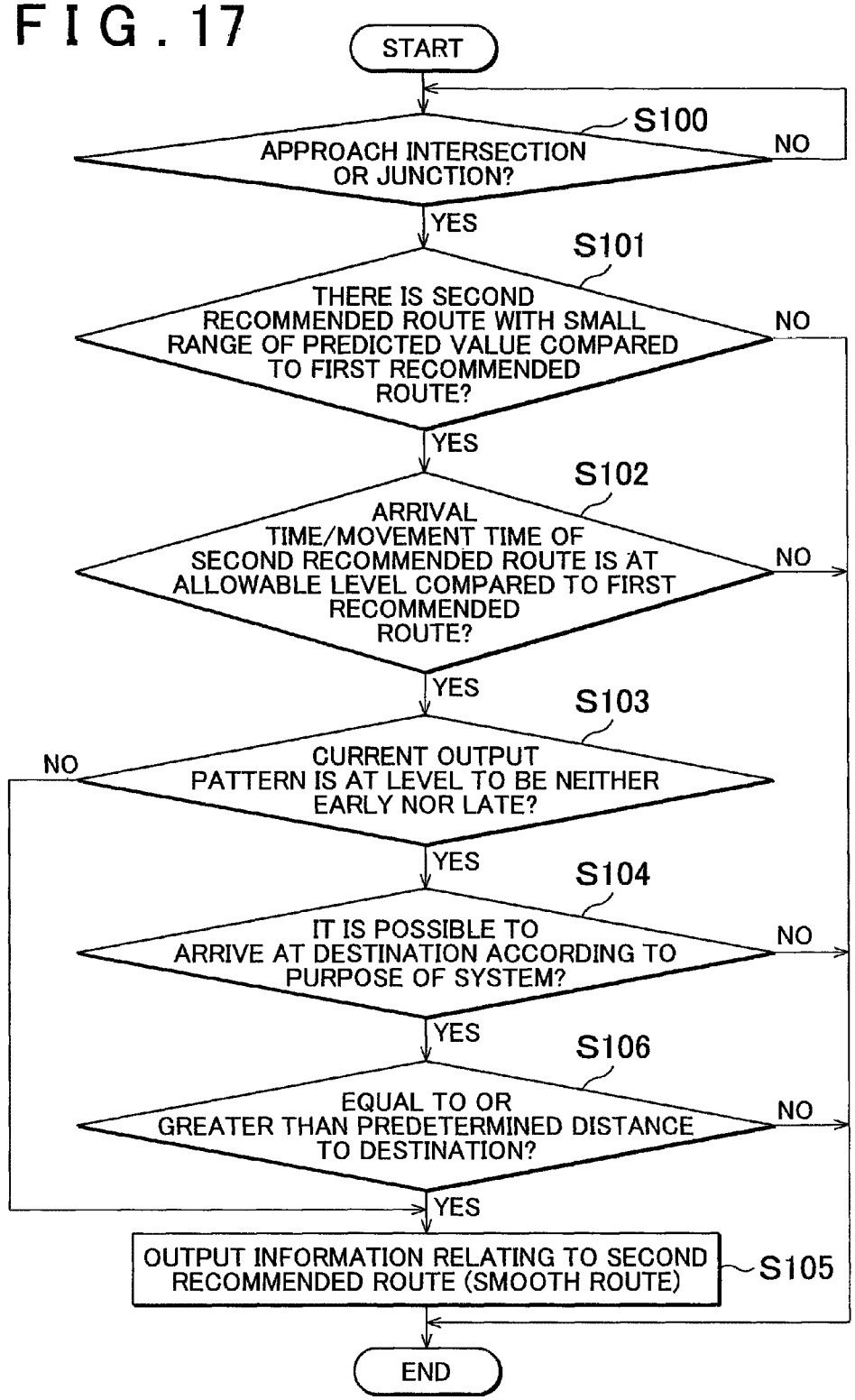
FIG. 17 is a flowchart showing an output procedure of a prediction error range of a recommended route concerning a seventh embodiment of a movement guidance device and a movement guidance method according to the invention.

Next, a seventh embodiment of a movement guidance device and a movement guidance method according to the invention will be described referring to FIG. 17 corresponding to FIG. 6 focusing on a difference from the first embodiment. The movement guidance device and the movement guidance method of this embodiment have the basic configuration as in the first embodiment. In FIG. 17, the substantially same elements as those in the first embodiment are represented by the same reference numerals, and overlapping description will be omitted.

The predicted value output unit 130 of this embodiment performs determination about the necessity of the output of information relating to the second recommended route based on the distance from the present place of the user to the destination when the second recommended route is guided. As the distance, for example, a distance is set such that the difference in predicted arrival time or predicted movement time between the first recommended route and the second recommended route is equal to or greater than a given value.

Here, as shown in FIG. 17, if it is determined that Step S104 is established, the predicted value output unit 130 of this embodiment performs determination about whether or not the distance from the present place of the user (vehicle) to the destination is equal to or greater than a predetermined distance (Step S106). If it is determined that the predetermined distance is secured (Step S106: YES), the predicted value output unit 130 outputs information relating to the second recommended route (Step S105). If it is determined that the predetermined distance is not secured (Step S106: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(12) The necessity of the output of information relating to the second recommended route is determined based on whether or not the distance to the destination is equal to or greater than the predetermined distance. For this reason, when the distance to the destination is less than the predetermined distance, and when the difference in arrival time or movement time between the first and second recommended routes is within a predetermined time, there is a low advantage for the user in selecting the second recommended route, and the output of information relating to the second recommended route is not performed. To the contrary, when the predetermined distance is secured as the distance to the destination, and when the difference in arrival time or movement time between the first and second recommended routes is equal to or greater than a predetermined time, there is a high advantage for the user in selecting the second recommended route, and the output of information relating to the second recommended route is performed.

Eighth Embodiment

Figure 18:
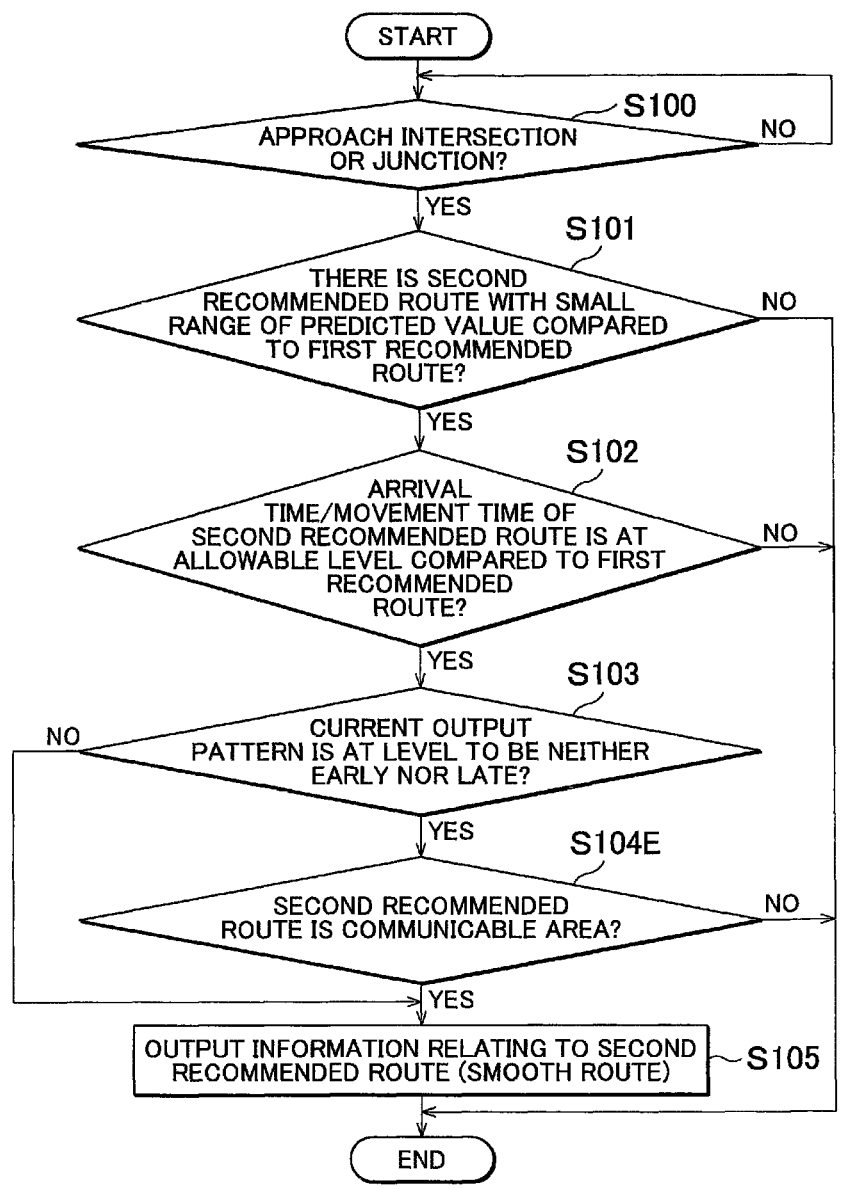
FIG. 18 is a flowchart showing an output procedure of a prediction error range of a recommended route concerning an eighth embodiment of a movement guidance device and a movement guidance method according to the invention.

Next, an eighth embodiment of a movement guidance device and a movement guidance method according to the invention will be described referring to FIG. 18 corresponding to FIG. 6 focusing on a difference from the first embodiment. The movement guidance device and the movement guidance method of this embodiment have the basic configuration as in the first embodiment. In FIG. 18, the substantially same elements as those in the first embodiment are represented by the same reference numerals, and overlapping description will be omitted.

The predicted value output unit 130 of this embodiment performs determination about the necessity of the output of information relating to the second recommended route based on whether or not the second recommended route is a communicable area of the information terminal 100. The determination about whether or not the second recommended route is a communicable area is performed based on, for example, map data or the like. The communicable area may be a communication area of an apparatus, such as another communication terminal or a smartphone of the user.

Here, as shown in FIG. 18, when it is determined that the output pattern of information relating to the second recommended route corresponds to the pattern 2 (Step S103: YES), the predicted value output unit 130 of this embodiment performs determination about whether or not the second recommended route is a communicable area (Step S104E).

Then, if it is determined that the second recommended route is a communicable area (Step S104E: YES), information relating to the second recommended route is output (Step S105). If it is determined that the second recommended route is not a communicable area (Step S104E: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(13) The necessity of the output of information relating to the second recommended route is determined based on whether or not the second recommended route is a communicable area. For this reason, a communication function of the information terminal 100 or another communication terminal is secured, and consequently, convenience of the user who uses the communication function is secured.

Ninth Embodiment

Figure 19:
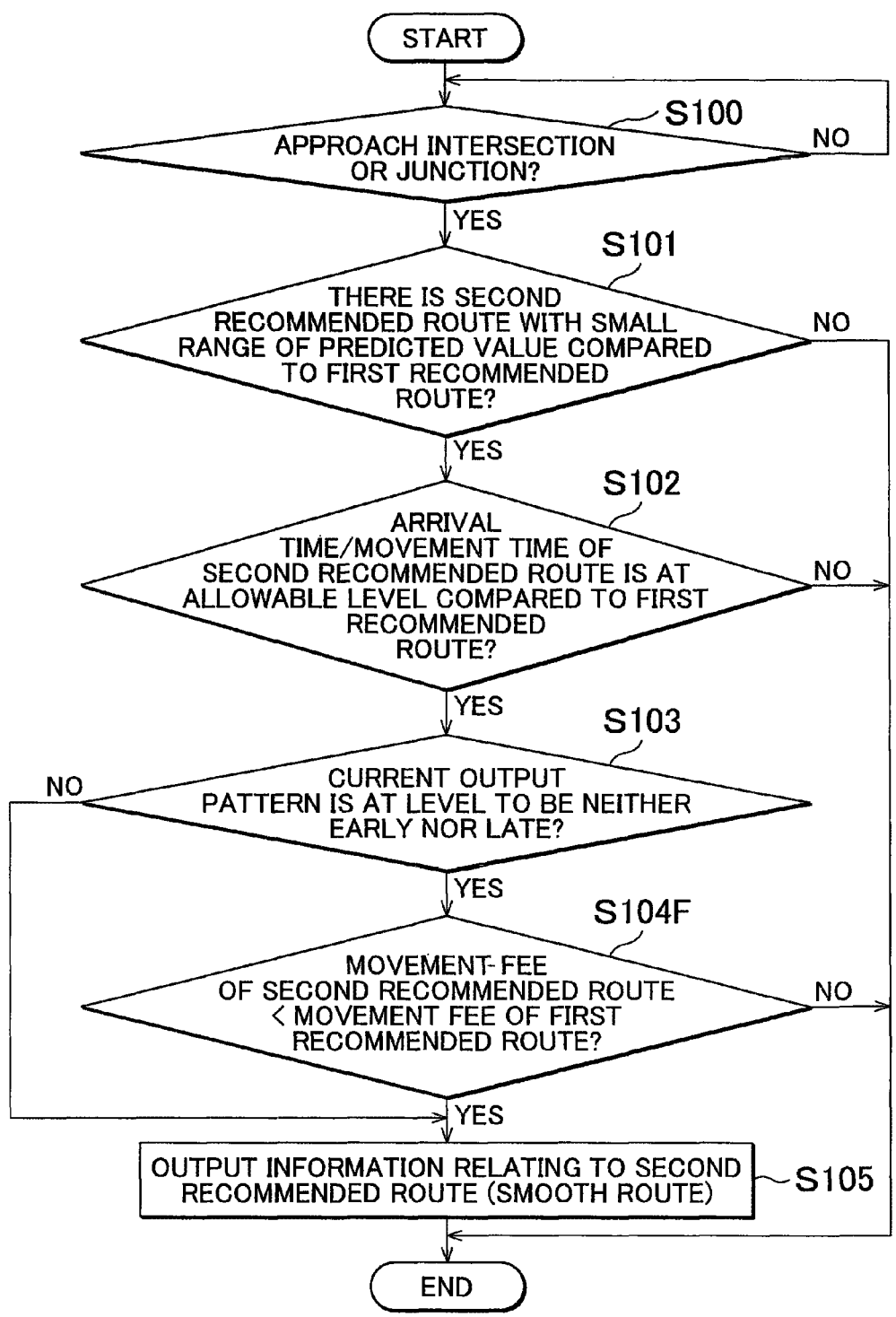
FIG. 19 is a flowchart showing an output procedure of a prediction error range of a recommended route concerning a ninth embodiment of a movement guidance device and a movement guidance method according to the invention.

Next, a ninth embodiment of a movement guidance device and a movement guidance method according to the invention will be described referring to FIG. 19 corresponding to FIG. 6 focusing on a difference from the first embodiment. The movement guidance device and the movement guidance method of this embodiment have the basic configuration as in the first embodiment. In FIG. 19, the substantially same elements as those in the first embodiment are represented by the same reference numerals, and overlapping description will be omitted.

The predicted value output unit 130 of this embodiment performs determination about the necessity of the output of information relating to the second recommended route based on a movement fee necessary until arrival at the destination. The movement fee includes, for example, a usage fee of a toll road, or the like, and is calculated based on the traffic information, map data, or the like.

Here, as shown in FIG. 19, when it is determined that the output pattern of information relating to the second recommended route corresponds to the pattern 2 (Step S103: YES), the predicted value output unit 130 of this embodiment performs determination about whether or not a movement fee when the second recommended route is used is lower than a movement fee when the first recommended route is used (Step S104F).

Then, if it is determined that the movement fee when the second recommended route is used is lower than the movement fee when the first recommended route is used (Step S104F: YES), information relating to the second recommended route is output (Step S105). If it is determined that the movement fee when the second recommended route is used is equal to or higher than the movement fee when the first recommended route is used (Step S104F: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(14) The necessity of the output of information relating to the second recommended route is determined based on whether or not the movement fee when the second recommended route is used is lower than the movement fee when the first recommended route is used. For this reason, a recommended route which has a small error range and a relatively inexpensive movement fee is provided to the user. Accordingly, it becomes possible to guide a user with a route having a high advantage in monetary movement cost.

Tenth Embodiment

Figure 20:
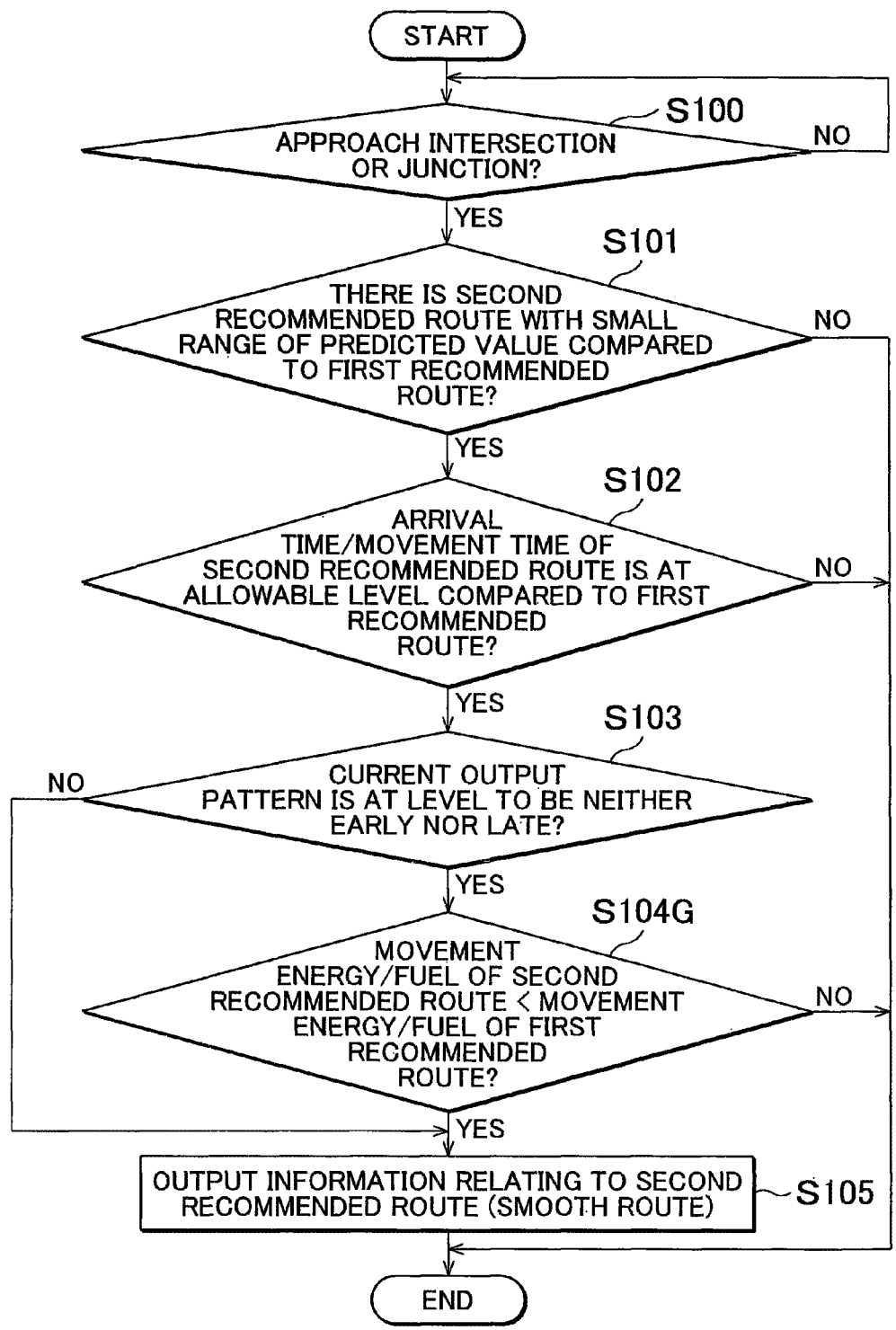
FIG. 20 is a flowchart showing an output procedure of a prediction error range of a recommended route concerning a tenth embodiment of a movement guidance device and a movement guidance method according to the invention.

Next, a tenth embodiment of a movement guidance device and a movement guidance method according to the invention will be described referring to FIG. 20 corresponding to FIG. 6 focusing on a difference from the first embodiment. The movement guidance device and the movement guidance method of this embodiment have the basic configuration as in the first embodiment. In FIG. 20, the substantially same elements as those in the first embodiment are represented by the same reference numerals, and overlapping description will be omitted.

The predicted value output unit 130 of this embodiment performs determination about the necessity of output of information relating to the second recommended route based on movement energy or fuel necessary until arrival at the destination. As movement energy, for example, power consumption when an electric automobile or a hybrid automobile is used as a mobile object is used. Movement energy or fuel of the movement route is calculated based on, for example, the traffic information, map data, or the like.

Here, as shown in FIG. 20, when it is determined that the output pattern of information relating to the second recommended route corresponds to the pattern 2 (Step S103: YES), the predicted value output unit 130 of this embodiment performs determination about whether or not movement energy or fuel when the second recommended route is used is smaller than movement energy or fuel when the first recommended route is used (Step S104G).

Then, if it is determined that movement energy or fuel when the second recommended route is used is smaller than movement energy or fuel when the first recommended route is used (Step S104G: YES), information relating to the second recommended route is output (Step S105). If it is determined that movement energy or fuel when the second recommended route is used is equal to or greater than movement energy or fuel when the first recommended route is used (Step S104G: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(15) The necessity of the output of information relating to the second recommended route is determined based on whether or not movement energy or fuel when the second recommended route is used is smaller than movement energy or fuel when the first recommended route is used. For this reason, a recommended route which has a small error range and relatively low movement energy or fuel is provided to the user. Accordingly, it becomes possible to guide a user with a route having a high advantage in movement cost relating to movement energy or fuel.

Eleventh Embodiment

Figure 21:
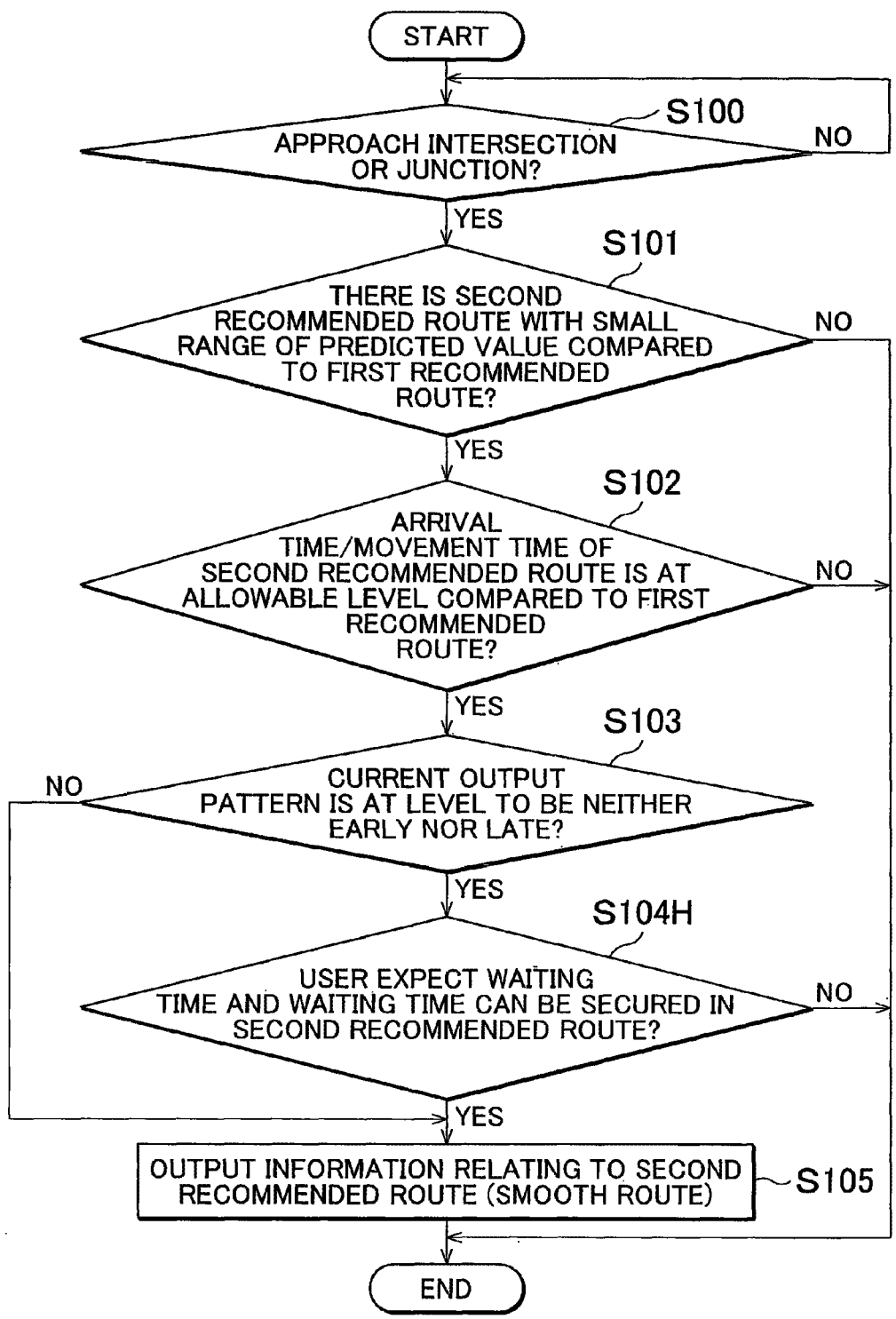
FIG. 21 is a flowchart showing an output procedure of a prediction error range of a recommended route concerning an eleventh embodiment of a movement guidance device and a movement guidance method according to the invention.

Next, an eleventh embodiment of a movement guidance device and a movement guidance method according to the invention will be described referring to FIG. 21 corresponding to FIG. 6 focusing on a difference from the first embodiment. The movement guidance device and the movement guidance method of this embodiment have the basic configuration as in the first embodiment. In FIG. 21, the substantially same elements as those in the first embodiment are represented by the same reference numerals, and overlapping description will be omitted.

For example, when the user expects an allowance time (waiting time) for performing an operation on the information terminal 100, another information terminal, or the like, the predicted value output unit 130 of this embodiment performs the output of information relating to the second recommended route, in which the allowance time is able to be secured. The determination about whether or not the allowance time is able to be secured is performed based on, for example, the number of traffic signals, a presentation cycle, or the like represented by traffic information or map data. The determination about whether or not the user expects the allowance time is performed based on, for example, whether or not the information terminal 100 is being operated, change in driving pattern of the user, or the like. The determination may be performed when the effect that the user expects the allowance time is input to the information terminal 100.

Here, as shown in FIG. 21, when it is determined that the output pattern of information relating to the second recommended route corresponds to the pattern 2 (Step S103: YES), the predicted value output unit 130 of this embodiment performs determination about whether or not the user expects the allowance time to be secured and the allowance time is able to be secured in the second recommended route (Step S104H).

Then, if it is determined that the user expects the allowance time to be secured and the allowance time is able to be secured in the second recommended route (Step S104H: YES), information relating to the second recommended route is output (Step S105). If it is determined that the user does not expect the allowance time to be secured or the allowance time is unable to be secured in the second recommended route (Step S104D: NO), the output of information relating to the second recommended route is limited, and only information of the first recommended route is output.

As described above, according to the movement guidance device and the movement guidance method of this embodiment, the effects of (1) to (5) are obtained, and the following effects are also obtained.

(16) The necessity of the output of information relating to the second recommended route is determined based on whether or not the user expects the allowance time to be secured and the allowance time is able to be secured in the second recommended route. For this reason, when the user expects the allowance time to be secured, the guidance of the second recommended route along the expectation is performed.

Twelfth Embodiment

Figures 22A, 22B:
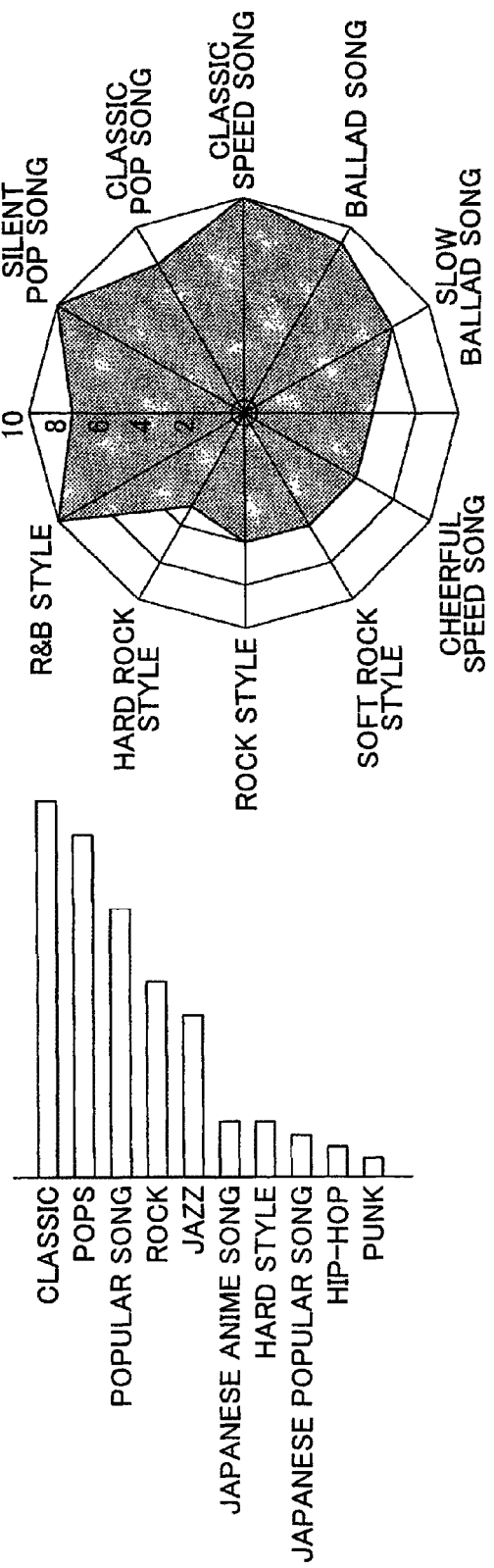
FIGS. 22A and 22B are diagrams showing an example of a music preference of a user concerning a twelfth embodiment of a movement guidance device and a movement guidance method according to the invention.
Figure 23:
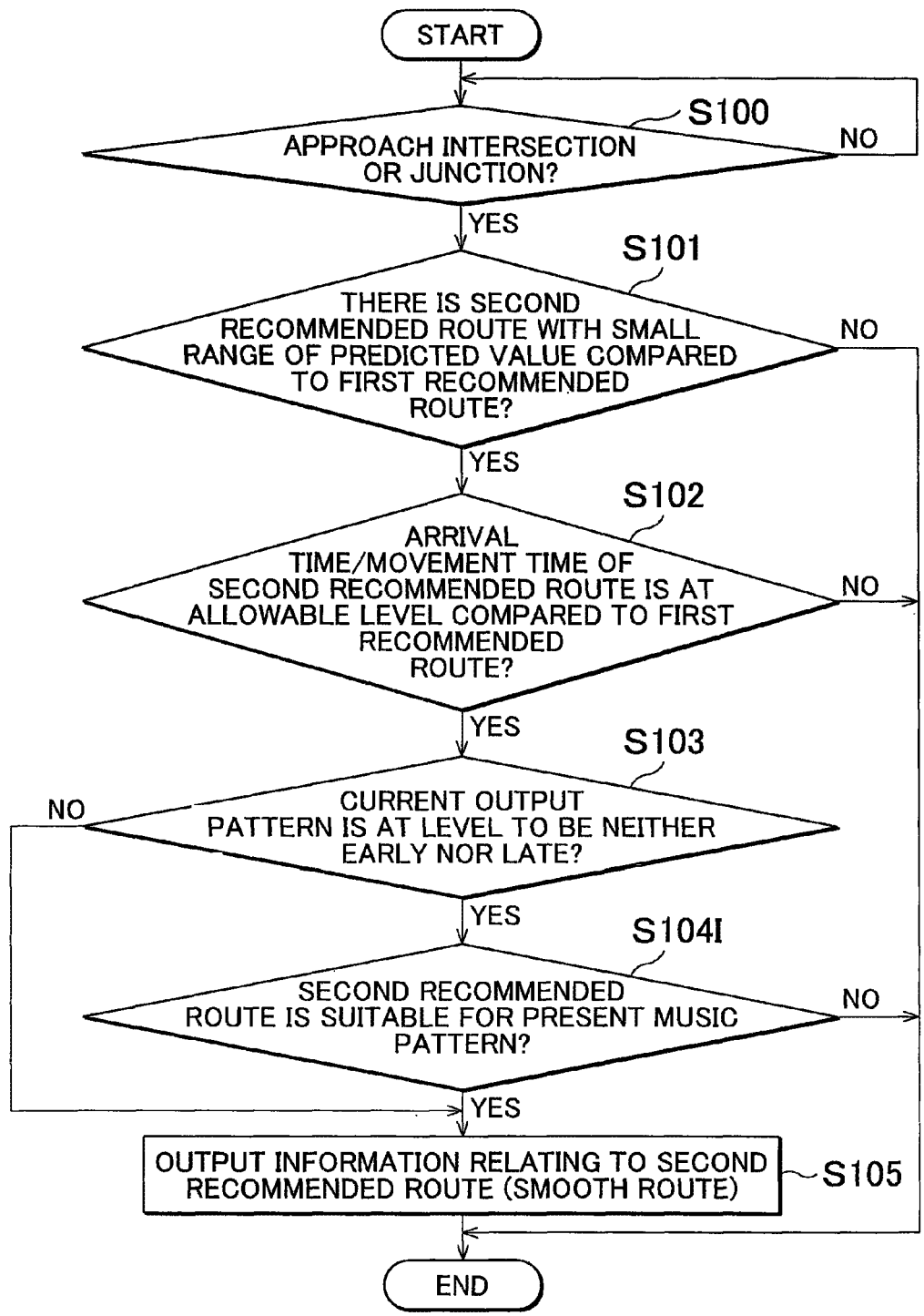
FIG. 23 is a flowchart showing an example of an output procedure of a prediction error range of a recommended route concerning this embodiment.

Next, a twelfth embodiment of a movement guidance device and a movement guidance method according to the invention will be described referring to FIGS. 22A, 22B, and 23 corresponding to FIG. 6 focusing on a difference from the first embodiment. The movement guidance device and the movement guidance method of this embodiment have the basic configuration as in the first embodiment. In FIGS. 22A, 22B, and 23, the substantially same elements as those in the first embodiment are represented by the same reference numerals, and overlapping description will be omitted.

The predicted value output unit 130 of this embodiment performs determination about the necessity of the output of information relating to the second recommended route based on the music preference of the user. As illustrated in FIGS. 22A and 22B, the music preference of the user tends to be an imbalanced music preference. Many users often select the type of music according to a traveling environment. Accordingly, in this embodiment, for example, the music preference of the user is specified in advance, and the type of music selected by the user is associated with a traveling environment at this time. Then, the guidance of a route conforming to music selected by the user is performed based on these kinds of information.

Here, as shown in FIG. 23, when it is determined that the output pattern of information relating to the second recommended route corresponds to the pattern 2 (Step S103: YES), the predicted value output unit 130 of this embodiment performs determination about the type of music currently being selected. The predicted value output unit 130 specifies a traveling environment (urban area, suburb, highway, scenery, or the like) associated with the determined type of music. Next, the predicted value output unit 130 searches for a second recommended route which is a route including the specified traveling environment and having variation smaller than the first recommended route (Step S104I).

If a second recommended route corresponding to the condition is specified (Step S104I: YES), the predicted value output unit 130 outputs information relating to the specified second recommended route (Step S105). When there is no second recommended route corresponding to the condition (Step S104I: NO), only information of the first recommended route is output.

As described above, according to the movement guidance device and the movement guidance method of this embodiment, the effects of (1) to (5) are obtained, and the following effects are also obtained.

(17) When there is a second recommended route which is a route including a traveling environment conforming to the music preference of the user and having variation smaller than the first recommended route, the second recommended route is guided to the user. For this reason, it becomes possible to guide a user with a second recommended route which conforms to the music preference of the user and has relatively small variation of the predicted arrival time or predicted movement time.

Thirteenth Embodiment

Figure 24:
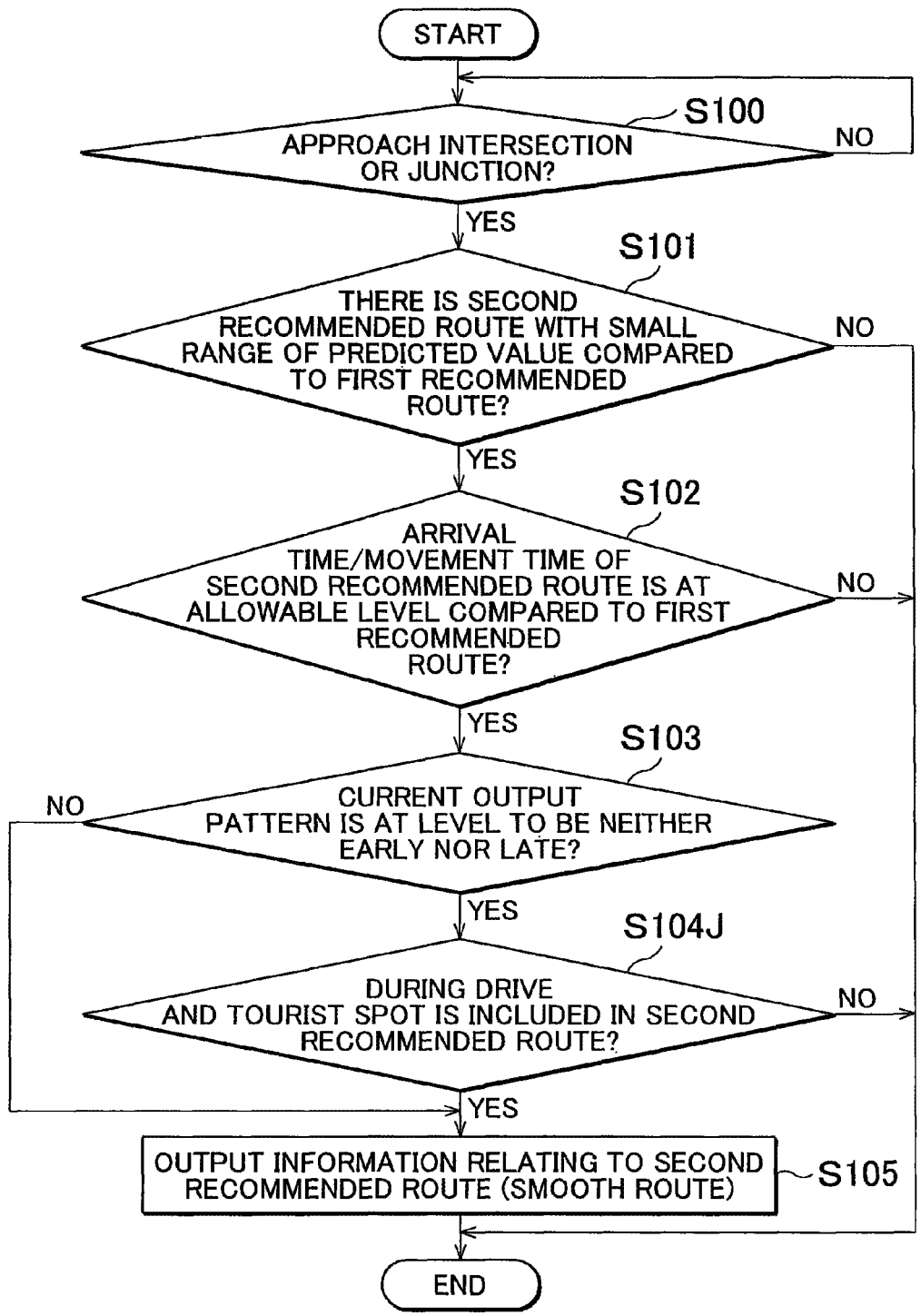
FIG. 24 is a flowchart showing an output procedure of a prediction error range of a recommended route concerning a thirteenth embodiment of a movement guidance device and a movement guidance method according to the invention.

Next, a thirteenth embodiment of a movement guidance device and a movement guidance method according to the invention will be described referring to FIG. 24 corresponding to FIG. 6 focusing on a difference from the first embodiment. The movement guidance device and the movement guidance method of this embodiment have the basic configuration as in the first embodiment. In FIG. 24, the substantially same elements as those in the first embodiment are represented by the same reference numerals, and overlapping description will be omitted.

The predicted value output unit 130 of this embodiment determines the necessity of the output of information relating to the second recommended route based on whether or not there is a route including a tourist spot or the like during a drive. The determination about whether or not the user is during a drive is performed based on, for example, whether or not it is a time zone other than a commuting time, whether or not it is the day off of the user, the type of destination, or the like. The determination about whether or not there is a route including a tourist spot or the like is performed based on, for example, traffic information, map data, or the like.

Here, as shown in FIG. 24, when it is determined that the output pattern of information relating to the second recommended route corresponds to the pattern 2 (Step S103: YES), the predicted value output unit 130 of this embodiment searches for a second recommended route along which the user is during a drive and which includes a tourist spot and has variation smaller than the first recommended route (Step S104J).

If a second recommended route corresponding to the condition is specified (Step S104J: YES), the predicted value output unit 130 outputs information relating to the specified second recommended route (Step S105). When there is no second recommended route corresponding to the condition (Step S104J: NO), only information of the first recommended route is output.

As described above, according to the movement guidance device and the movement guidance method of this embodiment, the effects of (1) to (5) are obtained, and the following effects are also obtained.

(18) When the second recommended route is a route along which the user is during a drive and which includes a tourist spot and has variation smaller than the first recommended route, the second recommended route is guided to the user. For this reason, it is possible to guide a user with a route having high probability of the user traveling willingly during a drive.

Fourteenth Embodiment

Figure 25:
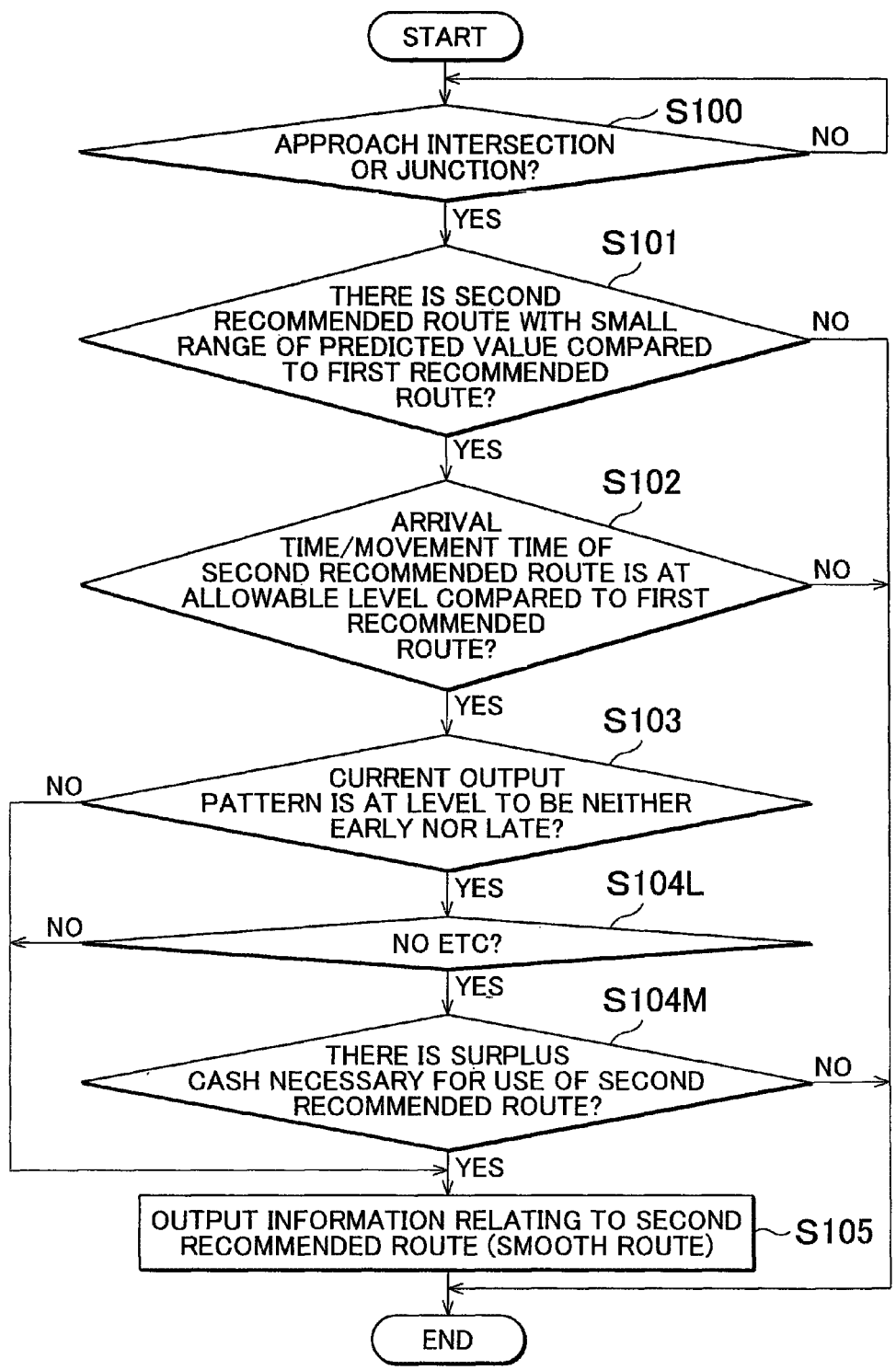
FIG. 25 is a flowchart showing an output procedure of a prediction error range of a recommended route concerning a fourteenth embodiment of a movement guidance device and a movement guidance method according to the invention.

Next, a fourteenth embodiment of a movement guidance device and a movement guidance method according to the invention will be described referring to FIG. 25 corresponding to FIG. 6 focusing on a difference from the first embodiment. The movement guidance device and the movement guidance method of this embodiment have the basic configuration as in the first embodiment. In FIG. 25, the substantially same elements as those in the first embodiment are represented by the same reference numerals, and overlapping description will be omitted.

The predicted value output unit 130 of this embodiment performs determination about the necessity of the output of information relating to the second recommended route based on a movement fee and payment capability of the user. The presence/absence of payment capability of the user is determined based on, for example, the presence/absence of an ETC and information representing a cash amount input to the information terminal 100 by the user.

Here, as shown in FIG. 25, when it is determined that the output pattern of information relating to the second recommended route corresponds to the pattern 2 (Step S103: YES), the predicted value output unit 130 of this embodiment performs determination about whether or not an ETC is provided in the vehicle which is used by the user (Step S104L). If it is determined that an ETC is not provided, determination is performed about whether or not the user is able to pay a movement fee necessary for movement in the second recommended route as a route having relatively small variation by cash (Step S104M).

If it is determined that the user is able to pay the movement fee (Step S104M: YES), information relating to the second recommended route is output (Step S105). If it is determined that the user is unable to pay the movement fee by cash (Step S104M: NO), the output of information relating to the searched second recommended route is limited, and only information of the first recommended route is output.

As described above, according to the movement guidance device and the movement guidance method of this embodiment, the effects of (1) to (5) are obtained, and the following effects are also obtained.

(19) The necessity of the output of information relating to the second recommended route is determined based on whether or not the user is able to pay the movement fee when the second recommended route is used. For this reason, information relating to the second recommended route, for which the user is unable to pay the movement fee, in other words, which is unable to be used is not guided.

Other Embodiments

The respective embodiments may be executed in the following forms. In the fifth embodiment, even though there is a point where a stopover is predicted in the first recommended route, when there is a point where a stopover is predicted in the second recommended route, information relating to the second recommended route may be output.

In the eighth embodiment, when the first and second recommended routes are an incommunicable area, the output of information relating to the second recommended route may be performed. In the respective embodiments, when fuel or consumption energy is lower or there is no point where fuel or consumption energy is able to be replenished in the second recommended route, and when fuel or consumption energy is lowered during movement along the second recommended route and cruising is impossible, the guidance of the second recommended route may be limited.

In the respective embodiments, c: control for performing the output of at least one of the prediction error range of the second predicted arrival time and the prediction error range of the second predicted movement time calculated by the second calculation unit 120 when prediction error range calculated by the second calculation unit 120 is smaller than the prediction error range calculated by the first calculation unit 110 may be performed. When precision of information relating to the second recommended route is relatively high, information relating to the second recommended route as further guidance different from the first recommended route is output, and only information relating to the second recommended route is output through this output control. Accordingly, the necessity of the output of information relating to the first recommended route with relatively low precision is lowered due to the presence of information relating to the second recommended route, and the output of information relating to the first recommended route is not performed. With this, it becomes possible for the user to easily confirm information with relatively high precision.

Figure 26:
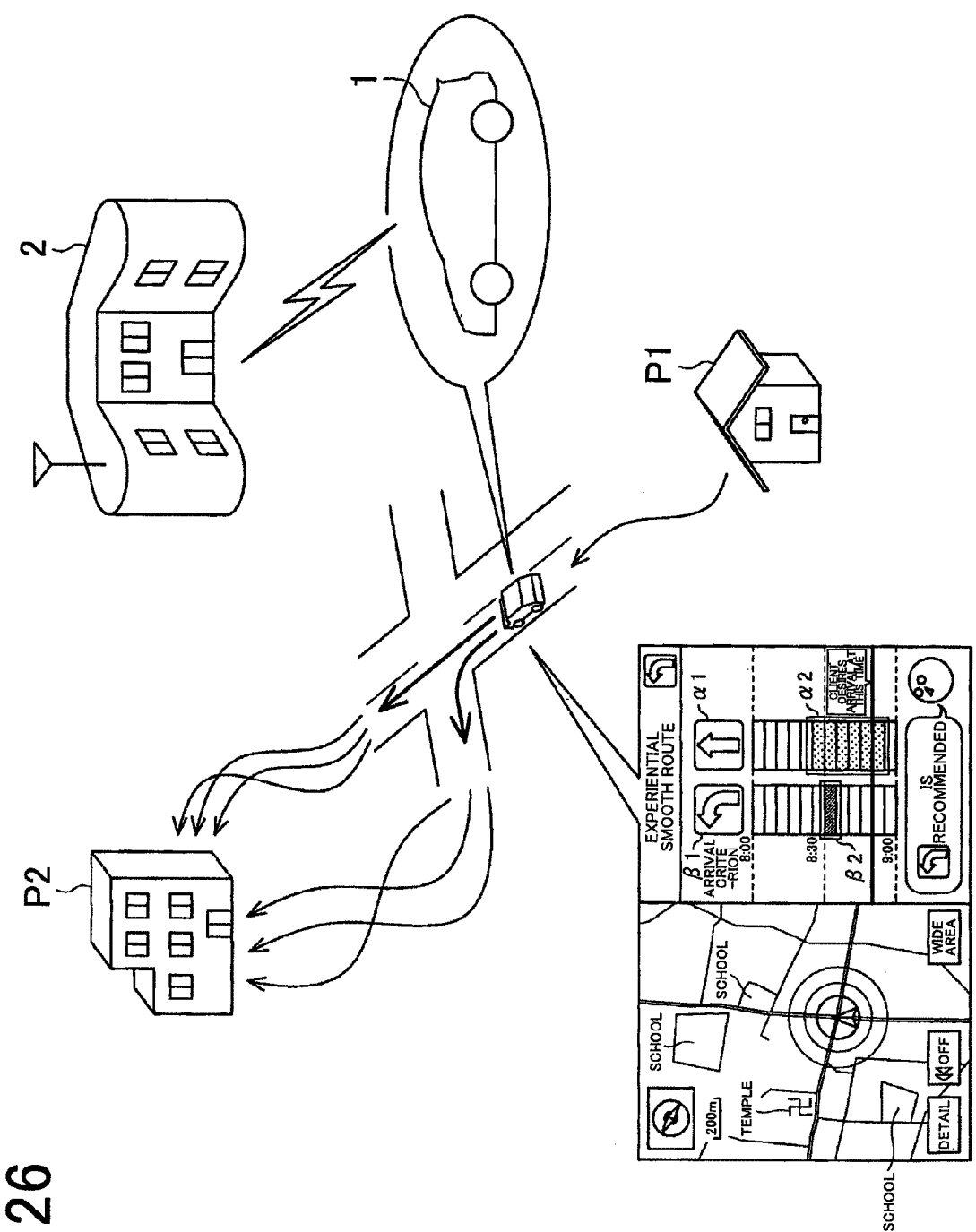
FIG. 26 is a diagram showing an example of a movement guidance device and a movement guidance method connected to a center concerning another embodiment of a movement guidance device and a movement guidance method according to the invention.

In the third to fourteenth embodiments, Step S104A to Step S104M may be executed under the condition that Step S104 of FIG. 6 is established. In the respective embodiments, as shown in FIG. 26, at least one of the first calculation unit 110, the second calculation unit 120, and the predicted value output unit 130 of the information terminal 100 may be provided in a center 2 which can perform communication with the information terminal 100 or a vehicle 1. With this, the information terminal 100 may merely display information calculated by the center 2 or information for which the necessity of the output is determined, thereby achieving reduction in processing load.

In the second embodiment, when there is no collective intelligence data having a high degree of coincidence with the user, the output of information relating to the second recommended route based on collective intelligence data may be limited.

In the respective embodiments, when the calculation of the prediction error range is performed based on the movement patterns (collective intelligence data) of a plurality of mobile objects, and when the divergence between the movement pattern used for the calculation and the movement pattern of a mobile object to be an output target of the prediction error range is equal to or greater than a predetermined value, the predicted value output unit 130 may limit the output of the prediction error range for which it is determined that the divergence is equal to or greater than the predetermined value. With this, when the calculation of the prediction error range is performed based on the movement patterns of a plurality of mobile objects, and when the divergence between the movement pattern used for the calculation and the movement pattern of the mobile object to be the output target of the prediction error range is equal to or greater than the predetermined value, the output of the prediction error range for which it is determined that the divergence is equal to or greater than the predetermined value is limited. That is, when the movement patterns of a plurality of mobile objects used as so-called collective intelligence do not conform the characteristic of the user, for example, the movement time, the arrival time, and the prediction error ranges of the movement time and the arrival time calculated based on collective intelligence are highly likely to be different from the movement time or the arrival time by the user. However, with this, when the divergence between the movement pattern used for the calculation and the movement pattern of the mobile object to be the output target of the prediction error range is equal to or greater than the predetermined value, the output of the prediction error range for which it is determined that the divergence is equal to or greater than the predetermined value is limited, whereby information generated based on elements not conforming to the characteristic of the user is limited. In other words, only information generated based on elements conforming to the characteristic of the user is provided to the user.

In the respective embodiments, the output of information relating to each of the first and second recommended routes may be performed only by sound or only by an image. In the embodiments other than the second embodiment, the second calculation unit 120 may calculate the arrival time, the movement time, and the prediction error ranges of the arrival time and the movement time based on information registered in collective intelligence data. With this, the movement time, the arrival time, and the prediction error ranges are calculated based on the traveling histories of a plurality of vehicles which actually travel on a road.

Accordingly, it is expected that information relating to the second recommended route has a small error closer to an actual traveling environment.

In the respective embodiments, the first calculation unit 110 or the second calculation unit 120 may calculate the prediction error range based on a movement history of a vehicle to be an output target of the prediction error range. In this case, the second calculation unit 120 may dynamically calculate the prediction error range based on the movement history at a high frequency compared to the first calculation unit 110.

In the second embodiment, the second calculation unit 120 may evaluate the degree of coincidence of collective intelligence data and the movement pattern of the mobile object to be the output target of the prediction error range by factor relating to the mobile object, factor relating to the user of the mobile object, and factor relating to the traveling environment of the mobile object. Then, the movement time, the arrival time, and the prediction error ranges of the movement time and the arrival time relating to the second recommended route may be calculated using collective intelligence data for which the evaluated degree of coincidence is relatively high. With this, the predicted value output unit 130 can output information relating to the movement time, arrival time, and the prediction error ranges of the movement time and the arrival time calculated based on collective data having a high degree of coincidence as reliability "high".

In the respective embodiments, a mobile object may be the user who uses the information terminal 100, not a vehicle. With this, the guidance is possible during walking of the user or during movement using a bicycle.

In the respective embodiments, information relating to a recommended route and the prediction error range of the predicted arrival time is primarily output and guided to the user. The invention is not limited thereto, and information relating to a recommended route and the prediction error range of the predicted movement time may be output and guided to the user. Similarly, information relating to three of the recommended route, the prediction error range of the predicted arrival time, and the prediction error range of the predicted movement time may be output and guided to the user. The recommended route may not be output, and at least one of the prediction error range of the predicted arrival time and the prediction error range of the predicted movement time may be output.

In the respective embodiments, the second recommended route may include two or more routes. Then, the guidance of the route and the output of the prediction error range may be performed for each of the two or more second recommended routes. In the respective embodiments, the prediction error range of the predicted arrival time or the predicted movement time is calculated. Furthermore, a prediction error range may be calculated for at least one of the time necessary for movement of the mobile object, the movement distance of the mobile object to the destination, the amount of consumption of fuel or energy of the mobile object, and the usage fee of a route of the mobile object. Then, information relating to a recommended route having a relatively small prediction error range may be guided.

The invention claimed is:

1. A movement guidance device that is configured to output at least one of a predicted arrival time at which a mobile object is predicted to arrive at a destination and a movement time necessary until the mobile object arrives at the destination, the movement guidance device comprising:
   a processor configured to:
   calculate a first prediction error range of at least one of a first predicted arrival time and a first predicted movement time in a first recommended route to the destination;
   calculate a second prediction error range of at least one of a second predicted arrival time and a second predicted movement time in a second recommended route, which is a route to the destination and is different from the first recommended route, at a point where the mobile object is near an intersection or a branch road where the second recommended route is branched from the first recommended route;
   output to a display, in response to the second prediction error range being less than the first prediction error range, the first prediction error range and the second prediction error range; and
   output to a display, in response to the second prediction error range being greater than the first prediction error range, the first prediction error range.

2. The movement guidance device according to claim 1, wherein the movement guidance device is configured to limit the output of the second prediction error range when it is determined that a predetermined condition is not established for the second recommended route through comparison with the first recommended route.

3. The movement guidance device according to claim 2, wherein the predetermined condition is a condition relating to at least one of the magnitude of movement cost necessary for the movement of the mobile object, the latest time in the prediction error range of the predicted arrival time, and the longest time in the prediction error range of the predicted movement time, and the movement guidance device is configured to limit the output of the second predicted value when at least one of conditions that the second prediction error range has: the larger movement cost; the later latest time in the prediction error range of the predicted arrival time; or the longer longest time of the prediction error range of the predicted movement time; compared to the first prediction error range.

4. The movement guidance device according to claim 1, further configured to limit the output of the second prediction error range when it is determined that the second prediction error range calculated using the second predicted arrival time does not satisfy a predetermined condition for at least one of a target arrival time of an user of the mobile object and an occurrence time zone of an event at the destination.

5. The movement guidance device according to claim 4, wherein the predetermined condition for the target arrival time or the occurrence time zone of the event is at least one of a condition that the difference between the second prediction error range and the target arrival time or the occurrence time zone of the event is equal to or greater than a predetermined time and a condition that a delay occurs with a mobile object after arrival at the destination or in a schedule of the user of the mobile object.

6. The movement guidance device according to claim 1, wherein a predetermined point for use as the point in the calculation of the prediction error range is an intersection or a branch road, and the movement guidance device is configured to output the prediction error range each time the mobile object reaches a position near a predetermined point by a predetermined distance.

7. The movement guidance device according to claim 1, further configured to calculate the second prediction error range based on collective intelligence data, in which a movement history of each of a plurality of mobile objects are registered by feature, and the movement guidance device is configured to evaluate a degree of coincidence of the collective intelligence data and the movement pattern of a mobile object to be an output target of the second prediction error range by factor relating to the mobile object, factor relating to the user of the mobile object, and factor relating to a movement environment of the mobile object and is configured to perform determination about whether or not the output of information relating to the second recommended route is necessary based on whether or not the evaluated degree of coincidence is equal to or greater than a predetermined degree of coincidence.

8. The movement guidance device according to claim 1, further configured to calculate the first prediction error range based on traffic information or map data distributed from a road traffic information center, and calculate the second prediction error range based on a movement history of each of a plurality of mobile objects.

9. The movement guidance device according to claim 1, wherein the calculation of the prediction error range is performed based on the movement history of a mobile object to be an output target of the prediction error range or traffic information distributed from a road traffic information center, and the movement guidance device is configured to acquire the movement history or the traffic information used to compute the second prediction error range at a higher frequency compared the movement history or the traffic information used to compute the first prediction error range and is configured to dynamically calculate a prediction error range based on the acquired movement history or traffic information.

10. The movement guidance device according to claim 1, further configured to count the number of times of the mobile object not following the output first recommended route or second recommended route for each of the first recommended route and the second recommended route, and is configured to inhibit the guidance of a recommended route for which the counted number of times is equal to or greater than a predetermined value and the output of the prediction error range corresponding to the recommended route.

11. The movement guidance device according to claim 1, wherein, when the calculation of the prediction error range is performed based on the movement patterns of a plurality of mobile objects, and when the divergence between the movement pattern used for the calculation and the movement pattern of a mobile object to be an output target of a prediction error range is equal to or greater than a predetermined value, the movement guidance device is configured to limit the output of a prediction error range for which it is determined that the divergence is equal to or greater than the predetermined value.

12. A movement guidance device which is configured to output movement cost of a mobile object to a destination, the movement guidance device comprising:
a processor configured to:
calculate a first prediction error range of first movement cost of a first recommended route to the destination;
calculate a second prediction error range of second movement cost of a second recommended route, which is a route to the destination and includes one to a plurality of routes different from the first recommended route, for a point where the mobile object is near an intersection or a branch road where the second recommended route is branched from the first recommended route; and
output to a display, in response to the second prediction error range being smaller than the first prediction error range, the first prediction error range and the second prediction error range; and
output to a display, in response to the second prediction error range being greater than the first prediction error range, the first prediction error range.

13. The movement guidance device according to claim 12,
wherein the movement cost is at least one of the time necessary for the movement of the mobile object, the movement distance of the mobile object to the destination, the amount of consumption of fuel or energy of the mobile object, and the usage fee of a road of the mobile object.

14. A movement guidance method which outputs at least one of a predicted arrival time at which a mobile object is predicted to arrive at a destination and a movement time necessary until the mobile object arrives at the destination, the movement guidance method comprising:
calculating a first prediction error range of at least one of a first predicted arrival time and a prediction error range of a first predicted movement time in a first recommended route to the destination;
calculating a second prediction error range of at least one of a second predicted arrival time and a prediction error range of a second predicted movement time in a second recommended route, which is a route to the destination and includes one to a plurality of routes different from the first recommended route, at a point where the mobile object is near an intersection or a branch road where the second recommended route is branched from the first recommended route; and
outputting to a display, in response to the second prediction error range being less than the first prediction error range, the first prediction error range and the second prediction error range; and
outputting to a display, in response to the second prediction error range being greater than the first prediction error range, the first prediction error range.

15. The movement guidance device according to claim 1, wherein, in response to the second prediction error range being greater than the first prediction, the second prediction error range is not output to the display.

16. The movement guidance method according to claim 1, wherein, in response to the second prediction error range being greater than the first prediction, the second prediction error range is not output to the display.

* * * * *